(12) United States Patent
Iwamoto et al.

(10) Patent No.: US 8,170,341 B2
(45) Date of Patent: May 1, 2012

(54) IMAGE SIGNATURE EXTRACTION DEVICE

(75) Inventors: Kota Iwamoto, Minato-ku (JP); Ryoma Oami, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/145,482

(22) PCT Filed: Jan. 14, 2010

(86) PCT No.: PCT/JP2010/000156
§ 371 (c)(1),
(2), (4) Date: Jul. 20, 2011

(87) PCT Pub. No.: WO2010/084713
PCT Pub. Date: Jul. 29, 2010

(65) Prior Publication Data
US 2011/0280487 A1    Nov. 17, 2011

(30) Foreign Application Priority Data
Jan. 23, 2009  (JP) ................................ 2009-012813

(51) Int. Cl.
*G06K 9/66* (2006.01)
(52) U.S. Cl. ...................................... 382/190; 382/224
(58) Field of Classification Search ........... 382/181–231
See application file for complete search history.

(56) References Cited

U.S. PATENT DOCUMENTS 3,936,800 A * 2/1976 Ejiri et al. ..................... 382/205
5,157,743 A * 10/1992 Maeda et al. ................. 382/248
5,263,097 A * 11/1993 Katz et al. ..................... 382/190
(Continued)

FOREIGN PATENT DOCUMENTS
JP           8-500471 A        1/1996
(Continued)

OTHER PUBLICATIONS

Hampapur, Arun, et al., "Comparison of Distance Measures for Video Copy Detection," Proceedings of International Conference of Multimedia and Expo (ICME2001), 2001, p. 944-947.

(Continued)

*Primary Examiner* — Manav Seth
(74) *Attorney, Agent, or Firm* — Sughrue Mion, PLLC

(57) ABSTRACT

The image signature extraction device includes a first feature extraction means for extracting, from an image, first features corresponding to the respective dimensions of a feature vector; a second feature extraction means for extracting, from the image, second features which are different from the first features, corresponding to the respective dimensions of a feature vector; a feature type determination means for analyzing at least one of the image and the extracted first features as a subject for analysis to determine whether or not the feature vector constituted of the extracted first features has effectiveness in discriminating an image, and if the feature vector has the effectiveness, determining the first features to be the type of the features used for the respective dimensions, while if the feature vector does not have the effectiveness, determining the second feature to be the type of the features used for at least part of the dimensions and determining the first features to be the type of the features used for the remaining dimensions; and a feature vector generation means for generating a feature vector of the image from the extracted first features and the extracted second features, according to the determined type of the features used for the respective dimensions.

21 Claims, 12 Drawing Sheets

U.S. PATENT DOCUMENTS

| | | | | |
|---|---|---|---|---|
| 5,287,275 | A | * | 2/1994 | Kimura .................................. 1/1 |
| 5,436,653 | A | | 7/1995 | Ellis et al. |
| 5,485,531 | A | * | 1/1996 | Ichinohe et al. .............. 382/198 |
| 5,577,135 | A | * | 11/1996 | Grajski et al. ................ 382/253 |
| 5,802,207 | A | * | 9/1998 | Huang .......................... 382/224 |
| 7,379,627 | B2 | * | 5/2008 | Li et al. ........................ 382/305 |
| 7,643,684 | B2 | * | 1/2010 | Lee et al. ...................... 382/190 |
| 7,805,011 | B2 | * | 9/2010 | Klamer et al. ................ 382/232 |
| 2004/0179743 | A1 | * | 9/2004 | Shibata et al. ................ 382/239 |
| 2006/0193520 | A1 | * | 8/2006 | Mita et al. .................... 382/190 |

FOREIGN PATENT DOCUMENTS

| JP | 2002-099916 A | 4/2002 |
|---|---|---|
| JP | 2004-192555 A | 7/2004 |
| JP | 2005-100122 A | 4/2005 |
| JP | 2005-250972 A | 9/2005 |
| JP | 2005-309535 A | 11/2005 |

OTHER PUBLICATIONS

Iwamoto, Kota, et al., "Image Signature Robust to Caption Superimposition for Video Sequence Identification," Proceedings of International Conference on Image Processing (ICIP 2006), 2006, pp. 3185-3188.

* cited by examiner

IMAGE SIGNATURE EXTRACTION DEVICE

CROSS REFERENCE TO RELATED APPLICATIONS

This application is a National Stage of International Application No. PCT/JP2010/000156 filed Jan. 14, 2010, claiming priority based on Japanese Patent Application No. 2009-012813, filed Jan. 23, 2009, the contents of all of which are incorporated herein by reference in their entirety.

TECHNICAL FIELD

The present invention relates to an image signatures extraction device for extracting image signatures which are features for discriminating (determining the identity of) images.

BACKGROUND ART

Image signatures are image features for discriminating (determining the identity of) images. By comparing an image signature extracted from an image with an image signature extracted from another image, an identity scale (in general, referred to as similarity or distance) indicating a degree of the two images being identical can be calculated from a comparison result. Further, by comparing the calculated identity scale with a threshold, it is possible to determine whether or not the two images are identical. In this context, the meaning of "two images being identical" includes not only the case where the two images are identical at the level of image signals (pixel values of the pixels constituting the images), but also the case where one image is a duplicate image of the other by means of various alteration processes such as conversion of compression format of an image, conversion of size/aspect ratio of an image, adjustment of color tone of an image, various filtering processes (sharpening, smoothing, and the like) applied to an image, local processing (caption superimposition, cutout, and the like) applied to an image, and recapturing of an image. By using image signatures, as it is possible to detect duplication of an image or a moving image which is a collection of images, for example, image signatures are applicable to an illegal copy detection system for images or moving images.

Examples of image signatures are described in Non-Patent Document 1, Non-Patent Document 2, and Patent Document 1. The methods described in these documents include extracting features for a plurality of local regions of an image, quantizing the extracted features to calculate quantization indexes, and using the calculated quantization indexes for the respective local regions as a quantization index vector to use as an image signature.

Specifically, in Non-Patent Document 1 and Non-Patent Document 2, an image is divided into blocks. Each of the blocks is used as a local region, and a feature (quantization index) is extracted. Further, in Non-Patent Document 1, luminance distribution patterns within a block are classified into eleven types and are used as quantization indexes. In Non-Patent Document 2 (art described as "Local Edge Representation" in Non-Patent Document 2), a position of center of gravity of an edge point, extracted from a block, is quantized to be used as a quantization index.

On the other hand, as shown in FIG. 12, the method described in Patent Document 1 includes respectively calculating mean luminance values from thirty two pieces of rectangle regions 244 (among them, sixteen pieces of rectangle regions are shown in FIG. 12) at predetermined positions in an image 240, and calculating differences in mean luminance value between rectangle regions forming pairs (the paired rectangle regions are linked to each other with dotted lines 248 in FIG. 12), to thereby obtain difference vectors 250 in sixteen dimensions. With respect to the difference vectors 250, a composite vector is generated by means of vector transformation, and a quantization index vector in sixteen dimensions, acquired by quantizing the respective dimensions of the composite vector, is used as an image signature.

Patent Document 1: Japanese Unexamined Patent Publication No. 8-500471
Non-Patent Document 1: Kota Iwamoto, Eiji Kasutani, Akio Yamada, "Image Signature Robust to Caption Superimposition for Video Sequence Identification", Proceedings of International Conference on Image Processing (ICIP2006), 2006
Non-Patent Document 2: Arun Hampapur, Ruud M. Bolle, "Comparison of Distance Measures for Video Copy Detection", Proceedings of International Conference on Multimedia and Expo (ICME2001), p. 946, 2001

SUMMARY

Regarding an image signature, there is a type of image which cannot be discriminated even if any features are combined in any way, as long as the types of features and the number of dimensions to be combined are limited.

As the types of features and the number of dimensions to be combined are increased, the types of images which cannot be discriminated are decreased. However, this causes a negative effect of an increase in the size of an image signature (data size). If the size of an image signature is increased, problems such as an increase in the matching cost for matching image signatures and a matching method being complicated are caused.

An object of the present invention is to provide an image signature extraction device capable of solving a problem that if the number of dimensions is increased in order to increase the type of images which can be discriminated, a size of an image signature is also increased.

According to an aspect to the present invention, an image signature extraction device includes a first feature extraction means for extracting, from an image, first features corresponding to the respective dimensions of a feature vector; a second feature extraction means for extracting, from the image, second features which are different from the first features, corresponding to the respective dimensions of a feature vector; a feature type determination means for analyzing at least one of the image and the extracted first features as a subject for analysis to determine whether or not the feature vector constituted of the extracted first features has effectiveness in discriminating an image, and if the feature vector has the effectiveness, determining the first features to be the type of the features used for the respective dimensions, while if the feature vector does not have the effectiveness, determining the second feature to be the type of the features used for at least part of the dimensions and determining the first features to be the type of the features used for the remaining dimensions; and a feature vector generation means for generating a feature vector of the image from the extracted first features and the extracted second features, according to the determined type of the features used for the respective dimensions.

As the present invention is configured as described above, it is possible to provide an image signature extraction device capable of reducing the types of images which cannot be discriminated, without increasing the size of image signatures.

EXEMPLARY EMBODIMENTS

Next, a first embodiment of the present invention will be described in detail with reference to the drawings.

First Embodiment

Figure 1:
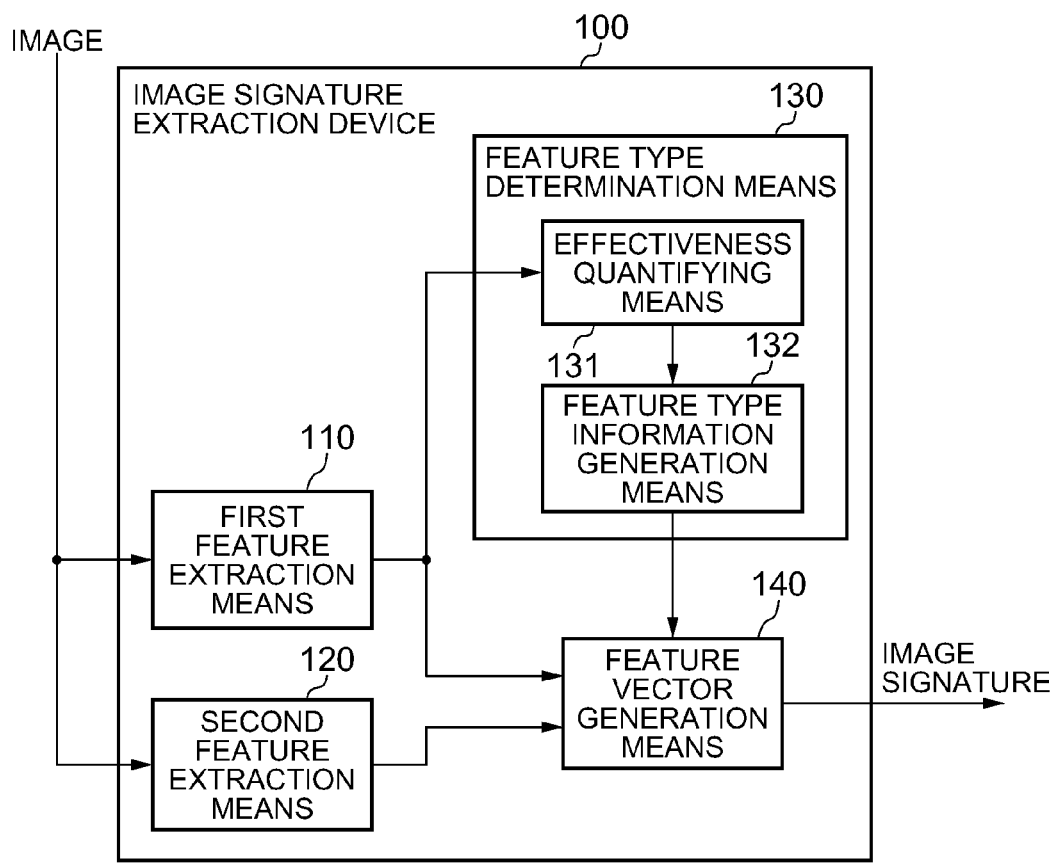
FIG. 1 is a block diagram showing a first embodiment of the present invention.

Referring to FIG. 1, an image signature extraction device 100 according to the first embodiment of the present invention receives an image, which is a subject for extracting an image signature, and outputs a feature vector of a plurality of dimensions for discriminating the image as an image signature. In order to do so, the image signature extraction device 100 includes a first feature extraction means 110, a second feature extraction means 120, a feature type determination means 130, and a feature vector generation means 140. Hereinafter, the functions of the respective means will be described in detail.

(1) First Feature Extraction Means 110

The first feature extraction means 110 extracts, from an image supplied as an input, a first feature for each dimension of a feature vector, and supplies it to the feature type determination means 130 and the feature vector generation means 140. The feature vector configured of the first features extracted by the first feature extraction means 110 is hereinafter referred to as a first feature vector.

The first features of the respective dimensions extracted from the image by the first feature extraction means 110 may be of any type, if the type is prescribed (fixed). For example, it is possible to use features which are the same as the features of the respective dimensions constituting the feature vector of the image signature described in any of Non-Patent Document 1, Non-Patent Document 2, and Patent Document 1. While the features of the respective dimensions constituting the feature vector of the image signature described therein are quantization indexes, the first features of the respective dimensions extracted from the image by the first feature extraction means 110 may not be quantization indexes but may be features constituted of continuous values. Further, the first features of the respective dimensions extracted from the image by the first feature extraction means 110 may be features improved to be effective with respect to a wider variety of types of images. An example thereof will be described with reference to FIG. 2.

Figure 2:
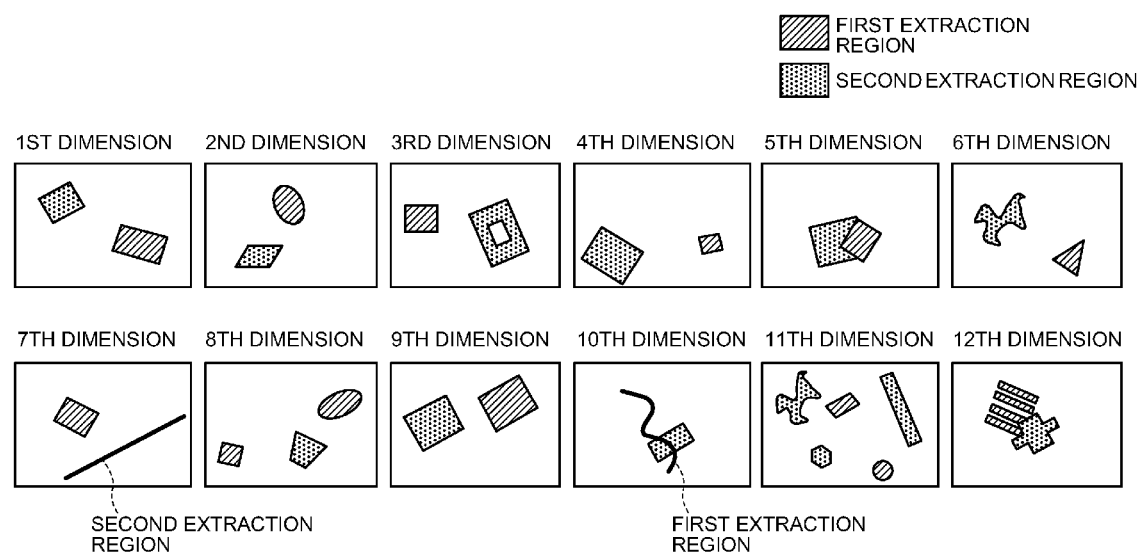
FIG. 2 is an illustration showing a method of extracting an image signature conceived of by the inventor of the present application.

FIG. 2 is an illustration showing an extraction method of exemplary features (hereinafter referred to as multi-shape region comparison features) which are improved to be effective with respect to a wide variety of types of images. For multi-shape region comparison features, two extraction regions (a first extraction region and a second extraction region) within an image are set beforehand to extract features for each dimension of a feature vector. A significant difference between the multi-shape region comparison feature and the feature described in Patent Document 1 is that shapes of extraction regions have variations. In order to extract multi-shape region comparison features, calculating, for each dimension, mean luminance values of the first extraction region and the second extraction region set for each dimension, and comparing the mean luminance value of the first extraction region with the mean luminance value of the second extraction region (that is, based on a difference value), quantizing the difference into three values (+1, 0, −1) to thereby obtain an quantization index. If the absolute value of the difference value between the mean luminance value of the first extraction region and the mean luminance value of the second extraction region is lower than or equal to a set threshold, it is determined that the mean luminance values of the first extraction region and the second extraction region have no difference, so that a quantization index is set to be 0, which indicates no difference. In other cases, the mean luminance value of the first extraction region and the mean luminance value of the second extraction region are compared, and if the mean luminance value of the first extraction region is larger, the quantization index is set to be +1, while the quantization index is set to be −1 in other cases. Assuming that the mean luminance value of the first extraction region is Vn1 and the mean luminance value of the second extraction region is Vn2 in a dimension n and a set threshold is th, the quantization index Qn in the dimension n can be calculated from the following expression.

$$Qn = +1 \text{ (if } |Vn1 - Vn2| > th \text{ and } Vn1 > Vn2\text{)} \quad \text{[Expression 1]}$$
$$0 \text{ (if } |Vn1 - Vn2| \leq th\text{)} -$$
$$1 \text{ if } |Vn1 - Vn2| > th \text{ and } Vn1 \leq Vn2\text{)}$$

(2) Second Feature Extraction Means 120

The second feature extraction means 120 extracts, from an image supplied as an input, a second feature which is different from a first feature for each dimension of a feature vector, and supplies it to the feature vector generation means 140. The second features of the respective dimensions extracted from the image by the second feature extraction means 120 may be of any type, if the type is prescribed (fixed).

However, in order to directly apply a matching method for a first feature vector, the values of the second features extracted by the second feature extraction means 120 must be a partial set of values which can be taken by the values of the first features (values of the features of the dimensions of the first feature vector) (but an empty set is not included). This is because when an identity is determined using image signatures of feature vectors in multiple dimensions and comparing the image signatures of two images, feature values of the same (corresponding) dimensions are compared to calculate the number of dimensions in which the values are matched as similarity for example, or to calculate a Hamming distance, a Euclidean distance, or a cosine similarity (inner product). As such, if the values of the second features are not a partial collection of the values of the first features, the matching method for the first feature vector cannot be directly applied to the second feature vector.

For example, if a first feature (a value of a feature of a dimension of a first feature vector) is a quantization index and takes any value of $\{+1, 0, -1\}$ as its value, a second feature extracted by the second feature extraction means 120 must be a quantization index, and a collection of values which may be taken is limited to a partial collection of $\{+1, 0, -1\}$, namely $\{+1, 0, -1\}$, $\{+1, 0\}$, $\{+1, -1\}$, $\{0, -1\}$, $\{+1\}$, $\{0\}$, or $\{-1\}$. The second feature extraction means 120 should not extract the value of a second feature as +2, because +2 is a value which cannot be taken by the first feature, so that if the value of a feature of a dimension of the first feature vector is replaced with this value, the matching method for the first feature vector cannot be applied.

Further, if the values of the first features (values of the features of the dimensions of a first feature vector) are discrete values or continuous values and the range thereof is defined, the values of the second features extracted by the second feature extraction means 120 must be the values included in the available value range. If a value range is not set for the values of the first features (values of the features of the dimensions of a first feature vector), there is no need to set a value range for the values of the second features extracted by the second feature extraction means 120.

The second features extracted by the second feature extraction means 120 may be any features as long as they satisfy the conditions described above. Further, the second feature extraction means 120 may extract features from the image in any way.

Further, the second feature extraction means 120 may assign an extracted feature to a dimension (determine to which dimension the extraction feature is assigned) by means of any method. For example, if the first feature vector uses the multi-shape region comparison feature, the second feature extraction means 120 may extract a second feature corresponding to the dimension D from two extraction regions corresponding to the same dimension D from which the multi-shape region comparison feature, which is the first vector, is extracted, or extract from another region or from the entire image. This means that the second feature extraction means 120 may extract a feature for a dimension independently of the method for extracting a feature by the first feature extraction means 110. Further, the second feature extraction means 120 may assign a feature extracted from an image to a plurality of dimensions. This means that the feature for each dimension extracted by the second feature extraction means 120 may be the same for a plurality of dimensions.

Further, the second feature extraction means 120 may allow a plurality of dimensions to indicate one meaning For example, it is possible to express one meaning by a set of a plurality of dimensions by combining a dimension 1 and a dimension 2 in such a manner that $\{0, 0\}$ indicates red, $\{0, 1\}$ indicates blue, $\{1, 0\}$ indicates green, and $\{1, 1\}$ indicates black, although each of the dimensions does not have any meaning independently.

Further, the second features extracted by the second feature extraction means 120 may be different types of features for the respective dimensions. For example, it is possible that color information is a feature for a dimension while edge information is a feature for another dimension.

The second features extracted by the second feature extraction means 120 are preferably features capable of compensating the first features if the first features (first feature vector) are less effective.

It should be noted that the effectiveness of the first feature vector means effectiveness when the first feature vector is used as an image signature. Measures for determining effectiveness as an image signature include "discrimination capability" and "robustness". Discrimination capability is a degree of discriminating a different image, and as the discrimination capability is higher, effectiveness is determined to be higher. Robustness is a degree that a value of a feature is not changed by various alteration processes applied to an image, and as the robustness is higher, effectiveness is determined to be higher.

As such, it is desirable that the second feature is a feature in which the discrimination capability becomes high when the discrimination capability of the first feature (first feature vector) is low. It is also desirable that the second feature is a feature in which the robustness becomes high when the robustness of the first feature (first feature vector) is low, for example. It is also desirable that the second feature is a feature of a different type from that of the first feature (first feature vector) or is a feature having less correlation with the first feature (first feature vector).

If the first feature (first feature vector) is information relating to the edge of an image, for example, the second feature is desirably a feature of a different type, that is, information relating to the color of the feature, for example.

Further, even if the second feature is a feature of the same type as that of the first feature (first feature vector) for example, the second feature may be a feature extracted from an area of different size or extracted using a different parameter (e.g., threshold). In that case, it is desirable that the size or the area for extraction or the parameter used for extraction is different such that the discrimination capability or the robustness becomes higher. For example, if the first feature (first feature vector) is information relating to the edge of an image, the second feature may be information relating to an edge which is extracted using a different scale or a different threshold from that used for the first feature. In that case, if the discrimination capability of the first feature vector is determined to be lower, for example, the second feature may be information relating to an edge extracted with a smaller scale. Further, if the robustness of the first feature vector is determined to be lower, for example, the second feature may be information relating to an edge extracted with a larger scale.

Now, an example of a second feature extracted by the second feature extraction means 120, if the first feature vector uses the above-described multi-shape region comparison feature, will be described. As a multi-shape region comparison feature is a feature expressing a relief in an image, if it is determined that the discrimination capability is low, that is, if there are a large number of dimensions in which quantization indexes are 0, it is desirable that a feature of a different type from the feature expressing a relief in the image is extracted as a second feature. Further, although the second feature is extracted from an extraction region which is the same as the extraction region for extracting the multi-shape region comparison feature for the same dimension, it may be extracted with a smaller threshold th, or may be extracted from a smaller extraction region compared with the extraction region for extracting the multi-shape region comparison feature.

For example, a second feature corresponding to a dimension D may be extracted from two extraction regions which are the same as the extraction region from which the multi-shape region comparison feature of the first feature vector, in the following manner for example (this means that with respect to the dimension D, the region for extracting the second feature may be the same as the region for extracting the first feature).

(A) The feather is extracted with a smaller threshold th.

(B) A representative value of the luminance of the two extraction regions is calculated not by a mean value but by another method (e.g., maximum value, minimum value, median value, mode value).

(C) A second feature is extracted from a mean luminance value of a smaller region of the two extraction regions.

(D) A representative value of the luminance values of the extraction regions is quantized to be used as a second feature. For example, a (comprehensive) representative value of the luminance values of the two extraction regions is calculated (for example, a mean value of mean values of the respective extraction regions is calculated), the representative luminance value is quantized into a three value to calculate a quantization index $\{+1, 0, -1\}$.

(E) Color information of the extraction region is extracted and quantized to be used as a second feature. For example, a mean value of RGB components in the extraction region is calculated, and is quantized in a three value by vector quantization to calculate a quantization index $\{+1, 0, -1\}$. Alternatively, a histogram of the hue components of the extraction region is generated, and the information thereof is quantized in a three value to calculate a quantization index $\{+1, 0, -1\}$, for example.

(F) With respect to the extraction region, the edge is extracted and quantized to be used as a second feature. For example, the total amount of the edge of the extraction region may be calculated and quantized, or the direction of the edge of the extraction region may be calculated and quantized.

(G) With respect to the extraction region, the frequency feature is extracted and quantized to be used as a second feature. For example, DCT conversion is performed on the extraction region, and the result thereof is quantized in a three value by vector quantization to calculate a quantization index $\{+1, 0, -1\}$.

Further, the second feature extraction means 120 may extract a second feature by a method in which an image is divided into blocks, and with use of the respective blocks as local regions, the features in the blocks are detected by template matching using a plurality of templates, and the number of the template with the highest score is used as a quantization index, for example.

Further, the second feature extraction means 120 may extract the second feature with respect to the dimension D by means of any of the methods shown in (A) to (G) above, from a region other than the two extraction regions for extracting the multi-shape region comparison feature of the same dimension of the first feature vector. Further, the second feature with respect to the dimension D may be extracted by means of any of the methods shown in (A) to (G) above from the entire image which is the extraction region.

Further, the second feature extraction means 120 may extract the second features by means of different feature extraction methods for the respective dimensions in a combined manner, for example.

Further, the second features may be features extracted from the entire image or a partial region of the image using different frequency bands, different edge extraction scales, different color components, or the like for each dimension. For example, it is possible to use a feature obtained by quantizing a frequency band for a dimension, and a feature obtained by quantizing another frequency band for another dimension. Specifically, by applying two-dimensional DCT to the entire image, for example, it is possible to obtain a second feature of a dimension 1 by quantizing the power of a frequency (u1, v1), obtain a second feature of a dimension 2 by quantizing the power of another frequency (u2, v2), obtain a second feature of a dimension 3 by quantizing the power of still another frequency (u3, v3), and the like.

Further, the second features may be obtained such that a feature of a dimension is obtained by quantizing the total amount of the edge extracted with a scale 1, a feature of another dimension is obtained by quantizing the total amount of the edge extracted with a twofold time scale, a feature of still another dimension is obtained by quantizing the total amount of the edge extracted with a threefold time scale, and the like, for example.

Further, the second features may be obtained such that a feature of a dimension is obtained by quantizing the value of an R component, a feature of another dimension is obtained by quantizing the value of a G component, a feature of still another dimension is obtained by quantizing the value of a B component, and the like, for example.

Further, the second features may be determined according to the values of the first features of the respective dimensions in the first feature vector. For example, in the case of multi-shape region comparison feature, if the first feature of a dimension is +1 or −1, it means that there is a luminance different between corresponding extraction regions, while if the first feature of a dimension is 0, it means that there is no luminance difference between them. As such, in the case of +1 or −1, detailed information regarding the luminance difference, that is, an index of +1, 0, or −1 quantized in large, medium, and small according to the magnitude of the difference may be used as a second feature. On the other hand, in the case of 0, as there is no luminance difference, color information for example, rather than luminance, may be used as a second feature. For example, it is possible to calculate a mean value of R components, a mean value of G components, and a mean value of B components, and quantize the information of the maximum component thereof to be used as a second feature. For example, the second feature may be an index of +1 if the R component is maximum, an index of 0 if the G component is maximum, or an index of −1 if the B component is maximum.

(3) Feature Type Determination Means 130

The feature type determination means 130 has a function of analyzing the first features extracted by the first feature extraction means 110 and determining whether or not the first feature vector constituted of the first features has effectiveness. Further, the feature type determination means 130 has a function such that if the first feature vector has effectiveness, it outputs feature type information in which the type of the features used for the respective dimensions are set to be the first feature, to the feature vector generation means 140, while if the first feature vector does not have effectiveness, it outputs feature type information in which the type of the features used for at least some dimensions is set to be the second feature and the type of features used for the remaining dimensions is set to be the first feature, to the feature vector generation means 140. The feature type determination means 130 is formed of an effectiveness quantifying means 131 and a feature type information generation means 132.

The effectiveness quantifying means 131 analyzes the first feature and outputs an effectiveness value indicating the degree of effectiveness of the first feature vector. It should be noted that an effectiveness value indicating the degree of effectiveness means information in which the degree of effectiveness is quantified.

The effectiveness quantifying means 131 generates an effectiveness value which is an index indicating the degree of either or both of discrimination capability or robustness, and outputs it to the feature type information generation means 132. Hereinafter, specific examples of effectiveness values for discrimination capability and robustness will be described separately.

(3-1) Effectiveness Value Indicating the Degree of Discrimination Capability (3-1-1) As an effectiveness value indicating the degree of discrimination capability, a value of probability of occurrence of a first feature vector constituted of the first features output from the first feature extraction means 110 may be used. In that case, the effectiveness quantifying means 131 estimates the probability of occurrence of a first feature vector, and outputs the estimated value to the feature type information generation means 132. The feature type information generation means 132 determines presence or absence of discrimination capability based on the magnitude of the probability. That is, if the estimated occurrence probability is large, as it means that the feature vector occurs frequently, the discrimination capability which is a degree of identifying a different image is determined to be low. If the estimated occurrence capability is low, as it means that the feature vector does not occur frequently, the discrimination capability which is a degree of identifying a different image is determined to be high.

Methods of estimating the probability of occurrence of the first feature vector includes an estimation method using probability density distribution of occurrence probability of the first feature vector, which has been observed with respect to an image population in advance.

Further, if the probability that a value of a feature occurs has been known for each of the dimensions of the first feature vector (this occurrence probability may be calculated from a learning image group, for example), it is also possible to estimate the occurrence probability of the entire first feature vector based on the occurrence probability of the feature value of each of the dimensions. As a most simple method, it is possible to calculate it as full multiplication (multiplied value) of the occurrence probabilities for all of the dimensions or a mean value of the occurrence probabilities for all of the dimensions.

It should be noted that as the estimated occurrence probability itself serves as information in which a degree of effectiveness is quantified (the effectiveness is lower as the occurrence probability is larger and the effectiveness is higher as the occurrence probability is lower), the effectiveness quantifying means 131 outputs the estimated occurrence probability as an effectiveness value to the feature type information generation means 132. The feature type information generation means 132 is able to determine presence or absence of the effectiveness such that the first feature vector does not have effectiveness if the estimated occurrence probability is larger than a threshold while the first feature vector has effectiveness if the estimated occurrence probability is smaller than a threshold.

(3-1-2) Further, as an effectiveness value indicating the degree of discrimination capability, it is possible to use a value of similarity between the first feature vector constituted of the first features output from the first feature extraction means 110 and a feature vector constituted of first features extracted from a frequently appearing image pattern. Frequently appearing image patterns mean different but similar image patterns which appear frequently in an image population. For example, if an image population includes images of the sea, there are image patterns of similar structures in which the lower half of an image is the sea and the upper half thereof is the sky. Further, in an image population including images of news programs, there are image patterns of similar structures in which the lower half of an image is a desk (table) and a person sits at the center of the image, although they are different images. As described above, in the images similar to the frequently appearing images, as their first feature vectors are similar to each other although they are different images, the first feature vector extracted therefrom has a low discrimination capability which is a degree of discriminating different images.

In that case, the effectiveness quantifying means 131 calculates a first feature vector constituted of the first features extracted by the first feature extraction means 110 and the similarity between it and the first feature vector extracted from a frequently appearing image pattern beforehand (e.g., the number of dimensions in which the features are coincide), and outputs the calculated similarity as an effectiveness value to the feature type information generation means 132. As the first feature vector extracted from a frequently appearing image pattern, a first feature vector extracted from a frequently appearing image pattern (e.g., an image as described above) in advance may be used, and this first feature vector may be given as a template. This template may be adapted to be updated from time to time. The feature type information generation means 132 determines that the discrimination capability is low if the calculated similarity is high, while the discrimination capability is high if the calculated similarity is low. Specifically, it can be determined that the first feature vector does not have effectiveness if the similarity between the first feature vector and the feature vector extracted from a frequently appearing image pattern is larger than a threshold, while the first feature vector has effectiveness if the calculated similarity is smaller than a threshold.

(3-1-3) Further, as an effectiveness value indicating the degree of discrimination capability, it is possible to use the number of dimensions in which the first features of the first feature vector constituted of the first features output from the first feature extraction means 110 become predetermined quantization indexes if the first features are quantized by means of a predetermined manner. This is a method of determining the discrimination capability of the first feature vector according to the characteristics of the first feature vector. In this example, the case of using the above-described multi-shape region comparison feature as a first feature of the first feature vector will be described.

The multi-shape region comparison feature is a feature obtained by comparing mean luminance values of two extraction regions for each of the dimensions, and encoding the resultant to be quantization index 0 if there is no difference, while if there is a difference, encoding the magnitude thereof to be a quantization index +1 or −1. This means that the multi-shape region comparison feature is generated by expressing a relief in a luminance image as a feature. Although the multi-shape region comparison feature has a sufficient discrimination capability with respect to an image in which the luminance image includes a relief, the value of the features become a quantization index 0 in a larger number of dimensions (all dimensions in some cases) with respect to an image where the luminance image does not have a relief or where a relief is small and is flat, such as a "blue sky image" or a "white wall image". This means that as the feature vectors are very similar in the images having no relief or images in which a relief is small and flat even though they are different images, the discrimination capability is low. As such, it is determined that there is no difference between the average luminance values of the two extraction region, and as quantization index is 0 in a larger number of dimensions, the discrimination capability is lower. That is, in the case of using the multi-shape region comparison feature as the first feature vector, the effectiveness quantifying means 131 outputs the number of dimensions in which the quantization index is 0 (the number of dimensions where it is determined that there is no difference between the mean luminance values of the two extraction regions) as a value indicating the degree of discrimination capability, to the feature type information generation means 132. The feature type information generation means 132 is able to determine that the first feature vector does not have an effectiveness if the number of dimensions in which the quantization index is 0 (the number of dimensions where it is determined that there is no difference between the mean luminance value of the two extraction regions) is larger than a threshold, while the first feature vector has an effectiveness if the number of dimensions in which the quantization index is 0 is not larger than a threshold.

(3-2) Effectiveness Value Indicating the Degree of Robustness

As an effectiveness value indicating the degree of robustness, a mean value of the values of robustness of the respective quantization indexes which are obtained by quantizing the first features of the first feature vector constituted of the first features output from the first feature extraction means 110, or the number of dimensions in which the quantization indexes are equal to or a smaller than a predetermined threshold or are equal to or larger than a predetermined threshold when the first features of the first feature vector are quantized by a predetermined method, or the number of dimensions in which quantization indexes having no robustness are generated when the first features of the first feature vector are quantized by a predetermined method. These are methods focused on the case where if the feature vector is a quantization index vector in which the respective dimensions of the first feature vector are constituted of quantization indexes, the robustness of each of the quantization indexes, that is, the degree that the quantization indexes are not changed by various alteration processing, may differ (robustness differs according to the quantization indexes).

The robustness of each of the quantization indexes may be obtained by applying various alteration processing to a learning image group and performing alteration processing to each of the quantization indexes, and then, measuring the proportion that the quantization indexes are not changed (proportion that before alteration and after alteration coincide). Such robustness of each of the quantization indexes has been given to the effectiveness quantifying means 131 beforehand.

The effectiveness quantifying means 131 obtains the robustness of each of the dimensions of the first feature vector from the quantization index of each of the dimensions of the first feature vector constituted of the first features output from the first feature extraction means 110 and the robustness of the given quantization index (proportion of the quantization indexes not being changed after alteration), and outputs the mean value thereof as a value indicating the degree of robustness, to the feature type information generation means 132. The feature type information generation means 132 is able to compare the mean value indicating the degree of robustness with a threshold to thereby determine whether or not the first feature value has robustness.

Further, the effectiveness quantifying means 131 may obtain the number of dimensions in which the robustness of the dimensions is larger than a threshold (the number of dimensions having quantization indexes in which the robustness thereof is larger than a threshold), among the dimensions of the first feature vector constituted of the first features output from the first feature extraction means 110, and output the number of dimensions as a value indicating the degree of robustness to the feature type information generation means 13. The effectiveness quantifying means 131 may obtain the number of dimensions in which the robustness of the dimensions is smaller than a threshold (the number of dimensions having quantization indexes in which the robustness thereof is smaller than a threshold), among the dimensions of the first feature vector constituted of the first features output from the first feature extraction means 110, and output the number of dimensions as a value indicating the degree of robustness to the feature type information generation means 132. The feature type information generation means 132 is able to compare the value indicating the degree of robustness with a threshold to thereby determine whether or not the first feature vector has robustness.

Further, the effectiveness quantifying means 131 may obtain the number of dimensions which become quantization indexes having no robustness (the number of dimensions having quantization indexes having no robustness), among the dimensions of the first feature vector constituted of the first features output from the first feature extraction means 110, and output the number of dimensions as a value indicating the degree of robustness to the feature type information generation means 132. The feature type information generation means 132 is able to compare the value indicating the degree of robustness with a threshold to thereby determine whether or not the first feature vector has robustness.

(3-3) Effectiveness Value Indicating the Degree of Discrimination Capability and Robustness It is possible to use a value calculated by simply adding the effectiveness value indicating the degree of discrimination capability obtained as described above and the effectiveness value indicating the degree of robustness obtained as described above, as an effectiveness value, or to use a value {$\alpha$*effectiveness value indicating the degree of discrimination capability+$(1-\alpha)$*effectiveness value indicating the degree of robustness} as an effectiveness value.

(4) Feature Type Information Generation Means 132

The feature type information generation means 132 compares the effectiveness value indicating the degree of effectiveness supplied from the effectiveness quantifying means 131 with a threshold to determine effectiveness of the first feature vector constituted of the first features supplied from the first feature extraction means 110, generates feature type information according to the determination result, and outputs it to the feature vector generation means 140.

If the feature type information generation means 132 determines that the first feature vector has effectiveness, the feature type information generation means 132 outputs used feature information defining that the type of the features used for the respective dimensions of the feature vector to be the first feature, to the feature vector generation means 140.

If the feature type information generation means 132 determines that the first feature vector does not have effectiveness, the feature type information generation means 132 outputs used feature information defining that the type of the features used for part or all of the dimensions of the feature vector is the second feature and that the type of the features used for the remaining dimensions to be the first feature, to the feature vector generation means 140.

If the first feature vector does not have effectiveness, the feature type information generation means 132 determines the dimensions for which the second feature is used, by means of any of the following methods.

(4-1) The dimensions for which the second feature is used may be determined in a fixed manner beforehand, for example. In that case, if the first feature vector consists of N dimensions, information of K dimensions among the N dimensions (K≦N) for which the second feature is used has been set in the feature type information generation means 132 in advance. When the feature type information generation means 132 determines that the first feature vector does not have effectiveness, the feature type information generation means 132 refers to the information defining dimensions for which the second feature is used, which has been set beforehand, to determine the dimensions for which the second feature is used, and also determines that the first feature is used for the dimensions other than such determined dimensions. Further, when the feature type information generation means 132 determines that the first feature vector does not have effectiveness, the feature type information generation means 132 may determine that the second feature is used for all dimensions of the first feature vector, for example.

(4-2) Further, the dimensions for which the second feature is used may be determined based on the values of the respective dimensions of the first feature vector. Specifically, it may be determined according to whether or not the predetermined quantization index is obtained when the first feature is quantized by a predetermined method. For example, for the dimensions in which the first features become predetermined quantization indexes, the type of the features to be used therefor is set to be the second feature, and the type of the features used for the other dimensions is set to the first feature.

For example, if the multi-shape region comparison features are used as the first feature vector, it may be determined that the second features are used in the dimensions where the quantization index is 0 and the first features are used for the other dimensions. This is because the multi-shape region comparison feature affects less to the discrimination capability if the value of the feature in the dimension is a quantization index 0 (there is no difference between the mean luminance values of the two extraction regions).

(4-3) Further, it is also possible to determine the dimensions for which the second feature is used according to whether or not the first feature becomes a quantization index in which the robustness is lowered when the first feature is quantized by means of a predetermined method. For example, for the dimensions in which the first feature becomes a quantization index having low robustness (quantization index in which the robustness is lower than a threshold), the type of the features to be used therefor is set to be the second feature, and the type of the features used for the other dimensions is set to be the first feature.

(4-4) In the methods described in the above 4-1 to 4-3, the number of dimensions for which the second feature is used may be determined according to the value indicating the degree of effectiveness of the first feature vector (as the degree of effectiveness is lower, the second feature is used in more dimensions).

For example, in the method described in 4-1 where the K dimensions (K≦N) for which the second features are used are determined in a fixed manner, the number of dimensions for which the second features are used may be increased or decreased within a range from K dimensions at maximum to 1 dimensions at minimum, according to the value indicating the degree of the effectiveness of the first feature vector.

Further, in the method described in 4-2 where the second features are used for the dimensions having the first features which become predetermined quantization indexes when the first features are quantized by a predetermined method, the number of dimensions for which the second features are used may be increased or decreased within a range from the number of dimensions having the first features which become predetermined quantization indexes to 1 dimension at minimum, according to the value indicating the effectiveness of the first feature vector.

Further, in the method described in 4-3 where the second features are used for the dimensions having the first features which become quantization indexes of low robustness when the first features are quantized by a predetermined method, the number of dimensions for which the second features are used may be increased or decreased within a range from the number of dimensions having the first features which become predetermined quantization indexes of low robustness to 1 dimension at minimum, according to the value indicating the effectiveness of the first feature vector.

(4-5) In the method described in the above 4-4, it is also possible to select the dimensions in such a manner that a priority table defining the priority of the dimensions for which the second features are used is set in the feature type information generation means 132, and the feature type information generation means 132 refers to the priority table to determine the number of dimensions for which the second features are used from the dimensions of higher priority, rather than selecting the dimensions for which the second features are used at random and increasing or decreasing it.

(4-6) It is also possible that the dimensions determined by means of any of the methods described in 4-2, 4-3, and 4-4 may be used as the dimensions for which the second features are used, among the dimensions for which the second features are determined to be used by the method described in 4-1. For example, it is assumed that the first feature vector is {dimension 1=0, dimension 2=0, dimension 3=+1, dimension 4=−1, dimension 5=0, dimension 6=−1, dimension 7=0, dimension 8=0, dimension 9=0, dimension 10=0}. Further, it is assumed that in the method of 4-1, even numbers of dimensions have been set beforehand to be the dimensions for which the second features are used. In this case, if this is combined with the method of 4-2 in which the dimensions where quantization index is 0 are determined to be used as the dimensions for which the second features are used, it is determined that the even numbers of dimensions where the quantization index is 0, namely a dimension 2, a dimension 8, and a dimension 10 are determined to be the dimensions for which the second features are used.

(5) Feature Vector Generation Means 140

The feature vector generation means 140 receives the first features of the respective dimensions from the first feature extraction means 110, receives the second features of the respective dimensions from the second feature extraction means 120, receives the feature type information from the feature type information generation means 132, uses the first features supplied from the first feature extraction means 110 for the dimensions for which the feature type information indicates that the first features are to be used and uses the second features supplied from the second feature extraction means 120 for the dimensions for which the feature type information indicates that the second features are to be used to thereby generate a feature vector, and outputs the generated feature vector as an image signature.

Figure 3:
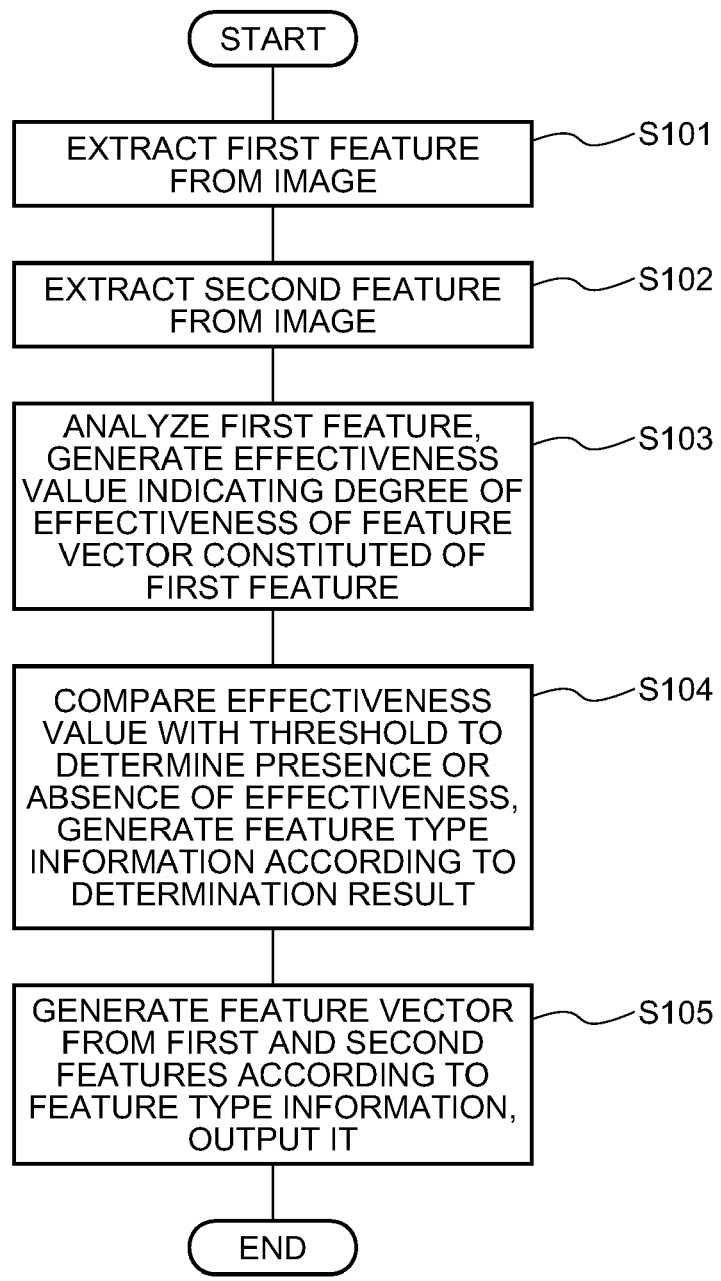
FIG. 3 is a flowchart showing operation of the first embodiment of the present invention.

Next, operation of the image signature extraction device 100 according to the present embodiment will be described with reference to the flowchart of FIG. 3.

When the image signature extraction device 100 receives an image which is a subject for extracting an image signature from a storage means or the like not shown in FIG. 1, first, the first feature extraction means 110 extracts first features for the respective dimensions from the image (step S101). Next, the second feature extraction means 110 extracts second features for the respective dimensions from the image (step S102).

Then, the effectiveness quantifying means 131 of the feature type determination means 130 analyzes the first features of the respective dimensions extracted from the first feature extraction means 110, and generates an effectiveness value indicating the degree of effectiveness of the first feature vector constituted of the first features (step S103). Then, the feature type information generation means 132 compares the generated effectiveness value with a threshold to determine whether or not the first feature vector has effectiveness, and according to the determination result, generates feature type information specifying which of the first features or the second features are used as the features of the respective dimensions (step S104).

Finally, the feature vector generation means 140 uses the first features extracted by the first feature extraction means 110 for the dimensions for which the feature type information specifies to use the first features, and uses the second features extracted by the second feature extraction means 120 for the dimensions for which the feature type information specifies to use the second features, to generate a feature vector for the dimensions, and outputs it as an image signature to the storage means or the like not shown in FIG. 1 (step S105).

The image signature (feature vector) generated as described above is managed in association with the image, and is used for discriminating (determining the identity of) an image. When the identity between an image and another image is determined, the image signatures corresponding to those two images are compared. Comparison between the image signatures is performed by comparing the values of the features of the same (corresponding) dimensions, and combining the comparison results of the respective dimensions, to calculate the scale for determining the identity between the two image signatures. This means that the scale for determining the identity between the image signatures is calculated by methods of calculating the number of dimensions in which the values of the features (quantization indexes) coincide as similarity (identity scale), calculating a Humming distance, calculating a Euclidian distance, or Calculating a cosine similarity (inner product). The identity scale calculated in this manner is compared with a threshold, whereby whether or not the two images are identical can be determined.

As described above, according to the present embodiment, it is possible to provide an image signature extraction device capable of extracting an image signature with which images of types which cannot be discriminated is able to be reduced, without increasing the size of the image signature. This is on the following grounds.

The first features are analyzed to determine whether the first feature vector constituted of the first features has effectiveness, and if it does not have effectiveness, that is, if the image which is the subject for extraction the image signature is an image of the type which cannot be discriminated by the combination of the features of the type extracted by the first feature extraction means 110, the type of the features used for at least part of the dimensions is changed from the first feature to the second feature. This substantially corresponds to an increase of the types of the features to be combined and the number of dimensions. Consequently, with respect to the image which cannot be discriminated with the first feature vector only consisting of the first features, it is possible to obtain an image signature with which the image can be identified. More specific description will be given below.

Here, three images of an image A, an image A', and an image B are considered. The image A is assumed to be an image formed by applying various alteration processing to the image A (for example, a caption is superposed on the image A and the compression form of the image is converted). This means that the image A and the image A' are pair of subject images which should be identified as identical images. The image B is assumed to be an image which differs from the image A and the image A' (a pair of subject images which should be discriminated as different images), but has a similar feature vector as a first feature vector. This means that between the image A (image A') and the image B, the discrimination capability will be low in the first feature vectors.

As such, if the first feature vectors are extracted regarding the image A, the image A', and the image B, those feature vectors are similar, whereby it is impossible to discriminate the image B from the image A (image A').

In this case, if the present embodiment is applied to the image A, the image A', and the image B, as the effectiveness of the first feature vectors is low, the features of at least part of the dimensions of the feature vector are replaced with the second features from the first features in every image. As the second features are different features from the first features, in the feature vector in which the features of at least part of the features are replaced with the second features from the first features, the effectiveness thereof would possibly be improved more than a little. This means that as the image A (image A') and the image B are different originally, if the values of the features are replaced with the second features, the feature vectors may be different sufficiently. On the other hand, as the image A and the image A' are identical originally, similar feature vectors will be generated even after the values of the features are replaced with the second features.

As such, when the values of the features are replaced with the second features, an identical image still has a similar feature vector while a different image has a sufficiently different feature vector so that it is separated. Accordingly, by replacing the values of the features with the second features, the performance of the image signature (feature vector) can be improved.

Next, an image D, which is different from the image A (image A') and the image B, will be considered. It is assumed that the first feature vector of the image D has high effectiveness, so that there is no need to replace the features with the second features, whereby the first feature vector is directly output.

Now, by performing replacement processing with the second features on the image A (image A') and the image B, there may be a case where the feature vector of the image A (image A') or the image B happens to become similar (close) to the feature vector of the image D on which no replacement processing has been performed. However, as the feature vector of the image A (image A') or the image B on which replacement processing has been performed and the feature vector of the image D on which no replacement processing has been performed are compared in such a manner that the first features and the second features, which are different originally, are compared, it is a mere coincidence, and the probability of an occurrence of such coincidence is low. As such, the possibility that a side effect is caused by replacing the features of at least part of the dimensions with the second features from the first features is low.

Second Embodiment

Figure 4:
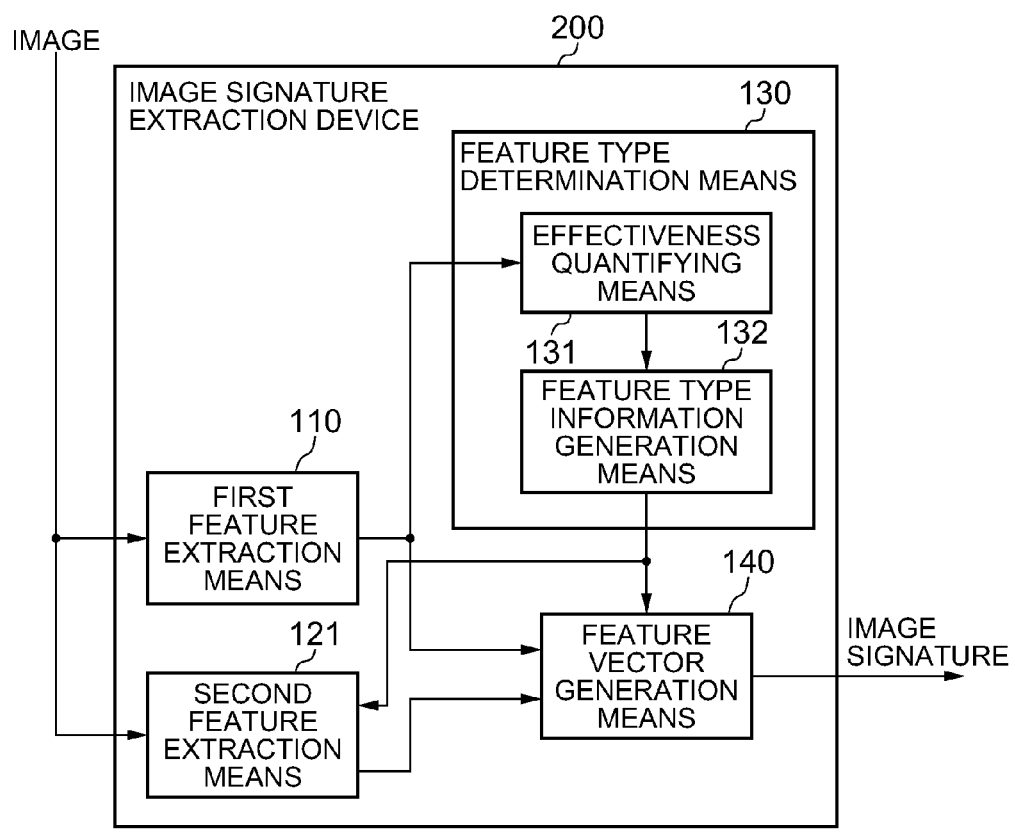
FIG. 4 is a block diagram showing a second embodiment of the present invention.

Referring to FIG. 4, an image signature extraction device 200 according to a second embodiment of the present invention differs from the image signature extraction device 100 shown in FIG. 1 in that a second feature extraction means 121 is provided instead of the second feature extraction means 120, and feature type information output from the feature type information generation means 132 is supplied not only to the feature vector generation means 140 but also to the second feature extraction means 121.

The second feature extraction means 121 receives an image which is a subject for extracting an image signature, and when feature type information is supplied from the feature type information generation means 132, for the dimensions in which the feature type information specifies that the second features should be used, extracts the second features which have been determined beforehand for those dimensions, and outputs them to the feature vector generation means 140. As such, the second feature extraction means 121 differs from the second feature extraction means 120 of the first embodiment in extracting the second features only for the dimensions requiring the second features.

Figure 5:
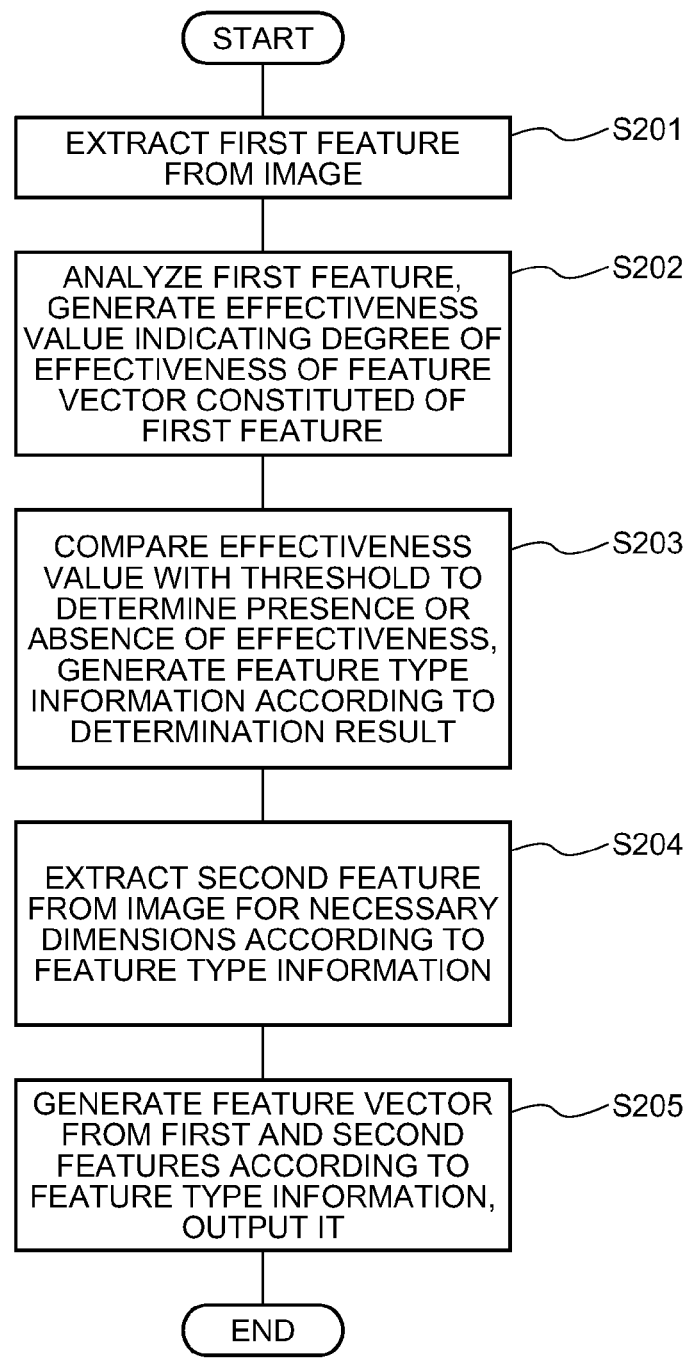
FIG. 5 is a flowchart showing operation of the second embodiment of the present invention.

Next, operation of the image signature extraction device 200 according to the present embodiment will be described with reference to the flowchart of FIG. 5.

When image signature extraction device 200 receives an image which is a subject for extracting an image signature from a storage means or the like not shown in FIG. 4, first, the first feature extraction means 110 extracts first features for the respective dimensions from the image (step S201).

Next, the effectiveness quantifying means 131 of the feature type determination means 130 analyzes the first features for the respective dimensions extracted from the first feature extraction means 110, and generates an effectiveness value indicating the degree of effectiveness of the first feature vector constituted of the first features (step S202). Then, the feature type information generation means 132 compares the generated effectiveness value with a threshold to determine whether or not the first feature vector has effectiveness, and according to the determination result, generates feature type information specifying which of the first features or the second features are used as the features of the respective dimensions (step S203).

Then, the second feature extraction means 121 extracts the second features for the dimensions for which the feature type information specifies to use the second features, from the image which is the subject for extracting the image signature (step S204).

Finally, the feature vector generation means 140 uses the first features extracted by the first feature extraction means 110 for the dimensions for which the feature type information specifies to use the first features, and uses the second features extracted by the second feature extraction means 120 for the dimensions for which the feature type information specifies to use the second features, to generate a feature vector for the dimensions, and outputs it as an image signature to the storage means or the like not shown in FIG. 4 (step S205).

According to the present embodiment, it is possible to achieve an advantageous effect which is the same as that of the first embodiment, and also it is possible to reduce the processing cost because the second feature extraction means 121 needs to extract second features for the required dimensions only when the second features are required.

Third Embodiment

Figure 6:
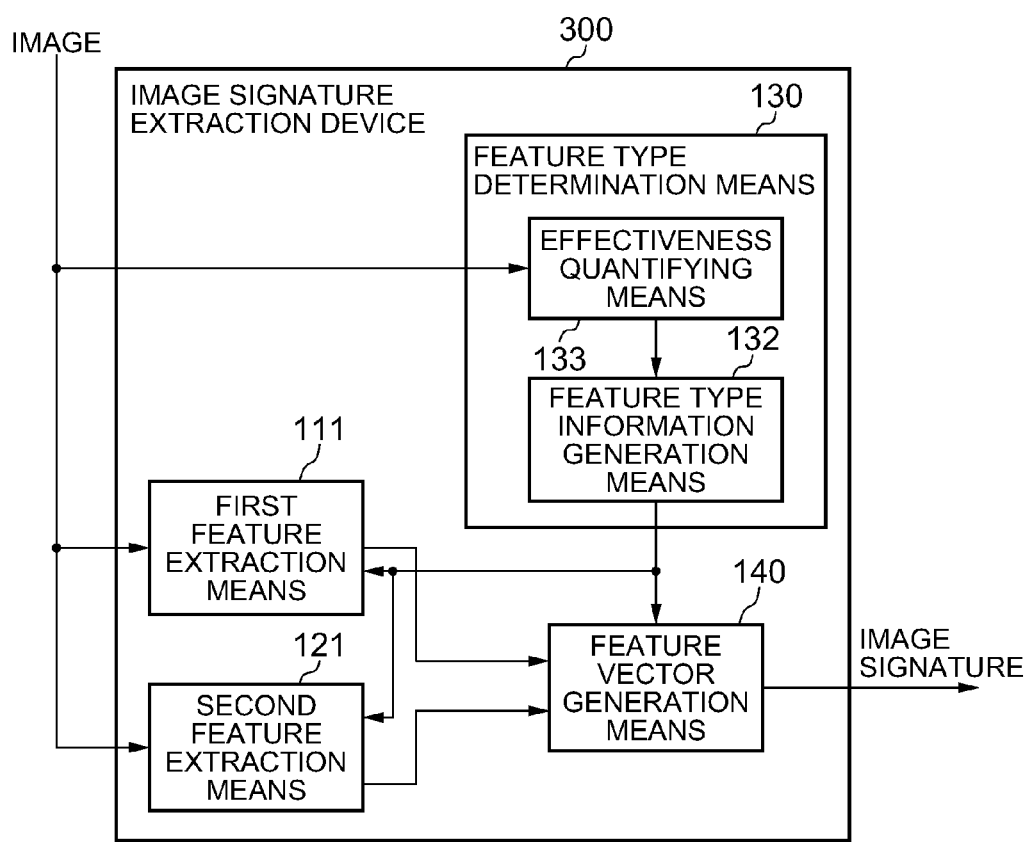
FIG. 6 is a block diagram showing a third embodiment of the present invention.

Referring to FIG. 6, an image signature extraction device 300 according to a third embodiment of the present invention differs from the image signature extraction device 100 shown in FIG. 1 in that a first feature extraction means 111, a second feature extraction means 121, and an effectiveness quantifying means 133 are provided instead of the first feature extraction means 110, the second feature extraction means 120, and the effectiveness quantifying means 131, that an image which is a subject for extracting an image signature, rather than the first feature extracted by the first feature extraction means, is input to the effectiveness quantifying means 133, and that feature type information output from the feature type information generation means 132 is also supplied to the first feature extraction means 111 and the second feature extraction means 121, besides the feature vector generation means 140.

The effectiveness quantifying means 133 analyzes the image, and outputs an effective value indicating the degree of effectiveness of a first feature vector constituted of the first features extracted from the image. Although the effectiveness quantifying means 131 analyzes the first features extracted by the first feature extraction means 110 and generates a value indicating the degree of effectiveness of the first feature vector in the first embodiment, in the present embodiment, the effectiveness quantifying means 133 generates an effectiveness value indicating the degree of effectiveness of the first feature vector from the image itself.

The effectiveness quantifying means 133 may use any method to generate a value indicating the degree of effectiveness of the first feature vector from the image itself, if such a method enables generation of a value indicating the degree of effectiveness of the first feature vector (that is, if such a method enables generation of a value having correlation with the case of actually extracting the first feature vector and generating the value indicating the degree of effectiveness).

For example, the effectiveness quantifying means 133 may extract features having the same characteristics as those of the first feature vector or features having a high correlation with the first feature vector in a simpler manner (with lower processing cost), rather than the first feature vector itself, and generate a value indicating the degree of effectiveness of the first feature vector based on those features.

Further, the effectiveness quantifying means 133 may estimate the probability of occurrence of the first feature vector from the image, and output the value of the probability as a value indicating the degree of effectiveness, for example. In that case, as the probability is larger, the degree of effectiveness (discrimination capability) is lower. Further, it is also possible to output a value of similarity between a frequently appearing image pattern (given in advance) and the supplied image, as a value indicating the degree of effectiveness, for example. In that case, as the similarity is larger, the degree of effectiveness (discrimination capability) is lower.

Further, the effectiveness quantifying means 133 may generates an effectiveness value indicating the degree of robustness of the features constituting the first feature vector from the image. For example, if the first feature vector is based on the hue (color angle), the degree of robustness of the hue, which is a first feature vector, can be estimated by extracting information regarding the saturation of the image from the image itself. This means that if the saturation is high, it is determined that robustness (credibility) of the hue information is high, so that the robustness (effectiveness) of the first feature vector is high. In contrast, if the saturation is low, it is determined that the robustness (confidence value) of the hue information is low, so that the robustness (effectiveness) of the first feature vector is low. As such, the value indicating the degree of saturation can be used as an effectiveness value indicating the degree of robustness of the features constituting the first feature vector.

Further, if the first feature vector is a multi-shape region comparison feature, the effectiveness quantifying means 133 is able to generate a value indicating the degree of effectiveness of the first feature vector from the image in the following manner.

(a) From the image, the features of part of the dimensions, rather than all of the dimensions, of the first feature vector are extracted to generate a value indicating the degree of effectiveness of the (entire) first feature vector.

(b) The image is divided in to extraction regions larger than the extraction regions to be used for the multi-shape region comparison feature to generate a value indicating the degree of effectiveness of the first feature vector based on the extracted features.

(c) The degree of generation of a quantization index 0 is estimated from the image to generate a value indicating the degree of effectiveness of the first feature vector. In this case, as the value indicating the degree of generation of the quantization index 0 is larger, the effectiveness of the first feature vector is lower.

(d) The flatness (a degree of no relief) of the image is obtained from the image, and the flatness is used as a value indicating the degree of effectiveness of the first feature vector. In this case, as the flatness of the image is higher, the effectiveness of the first feature vector is determined to be lower.

The first feature extraction means 111 receives an image which is a subject for extracting an image signature, and when feature type information is supplied from the feature type information generation means 132, for the dimensions in which the feature type information specifies that the first features should be used, extracts the first features which have been determined beforehand for those dimensions, and outputs them to the feature vector generation means 140. As such, the first feature extraction means 111 differs from the first feature extraction means 110 of the first embodiment in extracting the first features only for the dimensions requiring the first features.

The second feature extraction means 121 receives an image which is a subject for extracting the image signature, and when feature type information is supplied from the feature type information generation means 132, for the dimensions for which the feature type information specifies to use the second features, extracts the second features which have been determined beforehand for those dimensions, and outputs them to the feature vector generation means 140. As such, the second feature extraction means 121 differs from the second feature extraction means 120 in extracting the second features only for the dimensions requiring the second features.

Figure 7:
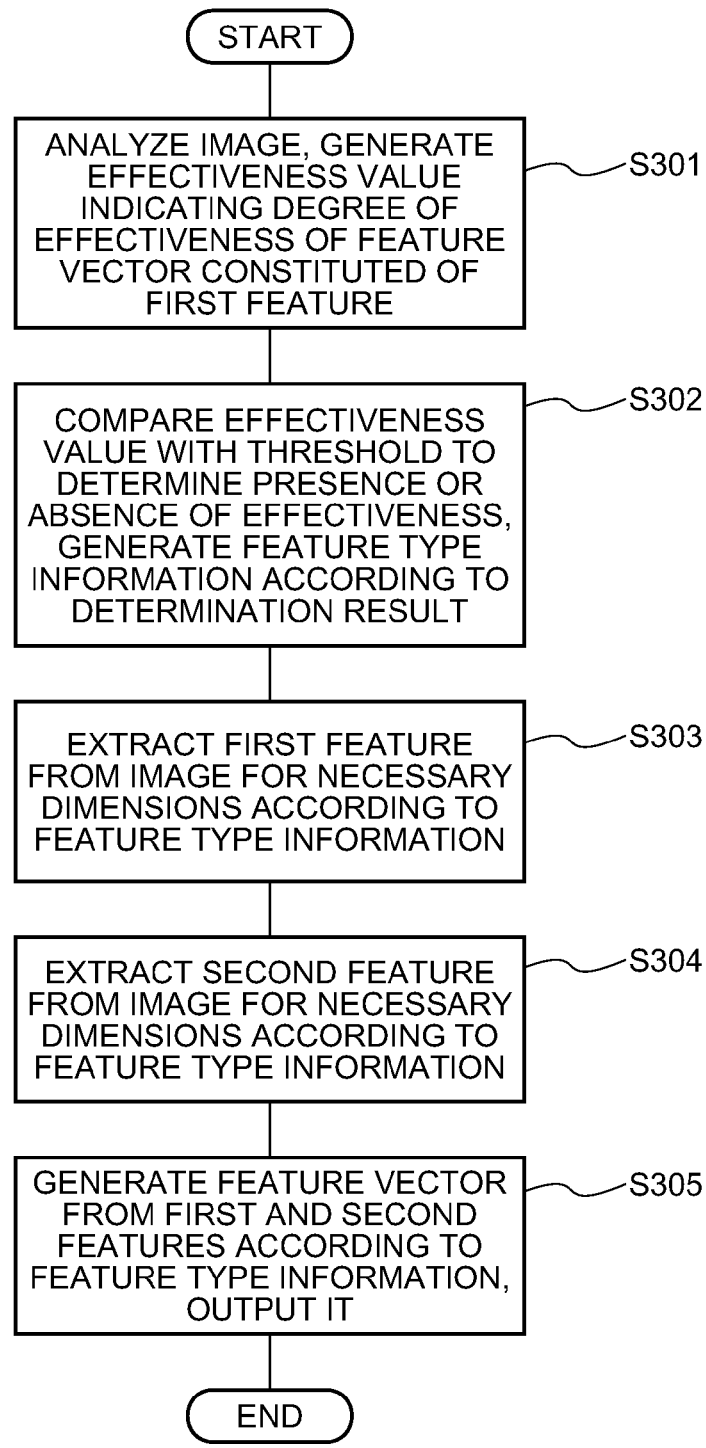
FIG. 7 is a flowchart showing operation of the third embodiment of the present invention.

Next, operation of the image signature extraction device 300 according to the present embodiment will be described with reference to the flowchart of FIG. 7.

When the image signature extraction device 300 receives an image which is a subject for extracting an image signature from a storage means or the like not shown in FIG. 6, first, the effectiveness quantifying means 133 of the feature type determination means 130 analyzes the image, and generates an effectiveness value indicating the degree of effectiveness of the first feature vector constituted of the first features extracted from the image (step S301). Next, the feature type information generation means 132 compares the generated effectiveness value with a threshold to determine whether or not the first feature vector has effectiveness, and according to the determination result, generates feature type information specifying which of the first features or the second features are used as the features of the respective dimensions (step S302).

Then, the first feature extraction means 111 extracts the first features for the dimensions for which the feature type information specifies to use the first features, from the image which is the subject for extracting the image signature (step S303). Further, the second feature extraction means 121 extracts the second features for the dimensions for which the feature type information specifies to use the second features, from the image which is the subject for extracting the image signature (step S304).

Finally, the feature vector generation means 140 uses the first features extracted by the first feature extraction means 111 for the dimensions for which the feature type information specifies to use the first features, and uses the second features extracted by the second feature extraction means 121 for the dimensions for which the feature type information specifies to use the second features, to generate a feature vector for the dimensions, and outputs it as an image signature to the storage means or the like not shown in FIG. 6 (step S305).

According to the present embodiment, it is possible to achieve the following advantageous effects, in addition to the advantageous effects of the first embodiment.

Whether or not the first feature vector has effectiveness can be determined from the image. In particular, even if the effectiveness cannot be determined from the first feature vector itself, there is a case where the effectiveness can be determined using the image. In such a case, the present embodiment particularly exhibits an advantageous effect. Hereinafter, description will be given with an example.

For example, as a multi-shape region comparison feature of a first feature, it is considered that one obtained by quantizing a hue component histogram is used for each of the dimensions. It should be noted that a hue (H) is a color angle (indicating a direction of a color such as red, blue, or yellow), and a hue component histogram represents appearance frequency of a hue for each angle section. Regarding the hue, if the saturation (S: vividness of the color) is lowered (corresponding to the radius of a circle), the credibility (that is, robustness) is lowered (if the saturation is decreased, all of the red direction, the blue direction, and the yellow direction are close to gray). This means that the robustness of hue information cannot be determined from the hue information but can be determined with saturation information (that is, if the saturation is low, robustness of the hue is low). As such, if one obtained by quantizing a hue component histogram is used as a first feature vector, the effectiveness thereof cannot be determined from the first feature vector itself. Meanwhile, it is possible to calculate a mean value of the saturation (S) from the extraction region of the dimension for each of the dimensions, and based on the magnitude thereof, determine the effectiveness of the first feature for each dimensions from the image. When they are summed for all of the dimensions, it is possible to determine the effectiveness of the entire first feature vector.

Further, according to the present embodiment, it is possible to reduce the processing cost because the first feature extraction means 111 needs to extract the first features for the required dimensions only when the first features are required. If there is no need to reduce the processing cost, the first feature extraction means 111 may be replaced with the first feature extraction means 110 used in the first embodiment.

Furthermore, according to the present embodiment, it is possible to reduce the processing cost because the second feature extraction means 121 needs to extract the second features for the necessary dimensions only when the second features are required. If there is no need to reduce the processing cost, the second feature extraction means 121 may be replaced with the second feature extraction means 120 used in the first embodiment.

Fourth Embodiment

Figure 8:
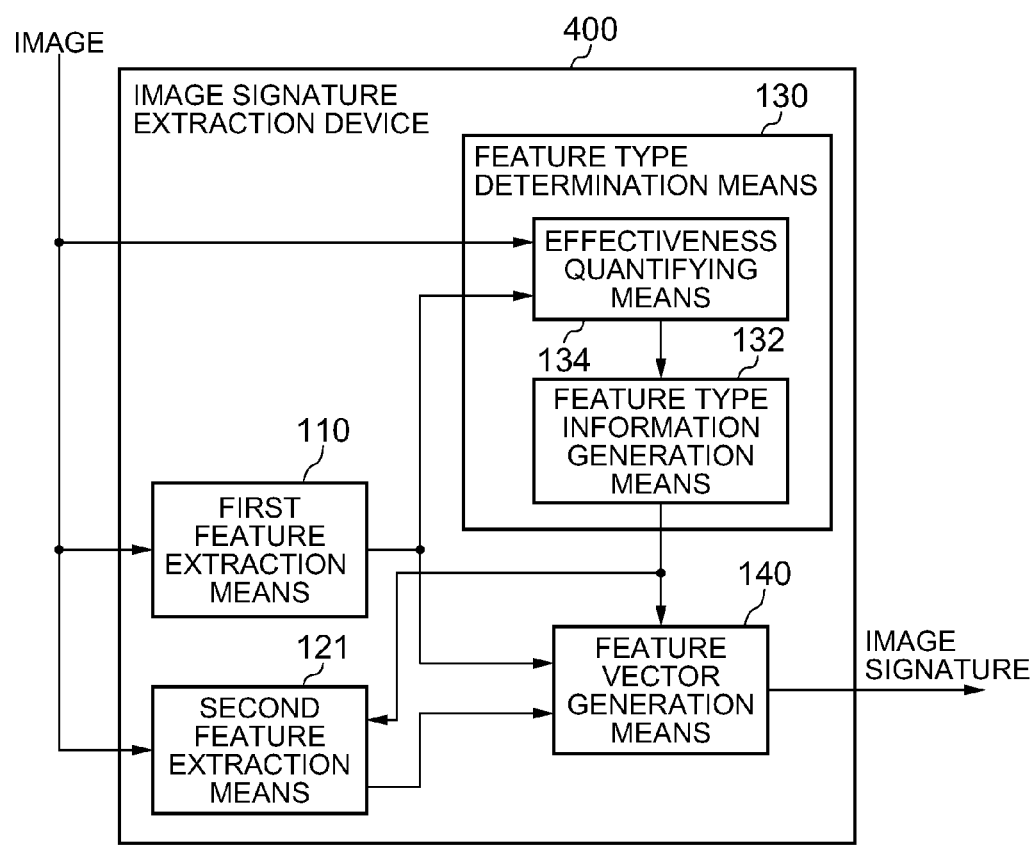
FIG. 8 is a block diagram showing a fourth embodiment of the present invention.

Referring to FIG. 8, an image signature extraction device 400 according to a fourth embodiment of the present invention differs from the image signature extraction device 100 shown in FIG. 1 in that a second feature extraction means 121 and an effectiveness quantifying means 134 are provided instead of the second feature extraction means 120 and the effectiveness quantifying means 131, that first features extracted by the first feature extraction means 110 and an image which is a subject for extracting an image signature are input to the effectiveness quantifying means 134, and that the feature type information output from the feature type information generation means 132 is also supplied to the second feature extraction means 121, besides the feature vector generation means 140.

The effectiveness quantifying means 134 analyzes the image and the first features extracted by the first feature extraction means 110 from the image, and outputs an effectiveness value indicating the degree of effectiveness of a first feature vector constituted of the first features extracted from the image. For example, the effectiveness quantifying means 134 generates an effectiveness value indicating the degree of effectiveness of the first feature vector from the first features extracted by the first feature extraction means 110 using a method which is the same as that used in the effectiveness quantifying means 131 shown in FIG. 1. Further, the effectiveness quantifying means 134 generates an effectiveness value indicating the degree of effectiveness of the first feature vector from the image using a method which is the same as that used in the effectiveness quantifying means 133 shown in FIG. 6. Then, the effectiveness quantifying means 134 generates an effectiveness value by combining the effectiveness value indicating the degree of effectiveness generated from the first feature vector and the effectiveness value indicating the degree of effectiveness generated from the image, and outputs it to the feature type information generation means 132.

Combination of the effectiveness value indicating the degree of effectiveness generated from the first feature vector and the effectiveness value indicating the degree of effectiveness generated from the image may be performed by a method of calculating a mean value of the both, calculating it by weighting the both, selecting a minimum value or a maximum value thereof, or the like.

The second feature extraction means 121 receives the image which is a subject for extracting the image signature, and when feature type information is supplied from the feature type information generation means 132, for the dimensions for which the feature type information specifies to use the second features, extracts the second features which have been determined beforehand for those dimensions, and outputs them to the feature vector generation means 140. As such, the second feature extraction means 121 differs from the second feature extraction means 120 in extracting the second features only for the dimensions requiring the second features.

Figure 9:
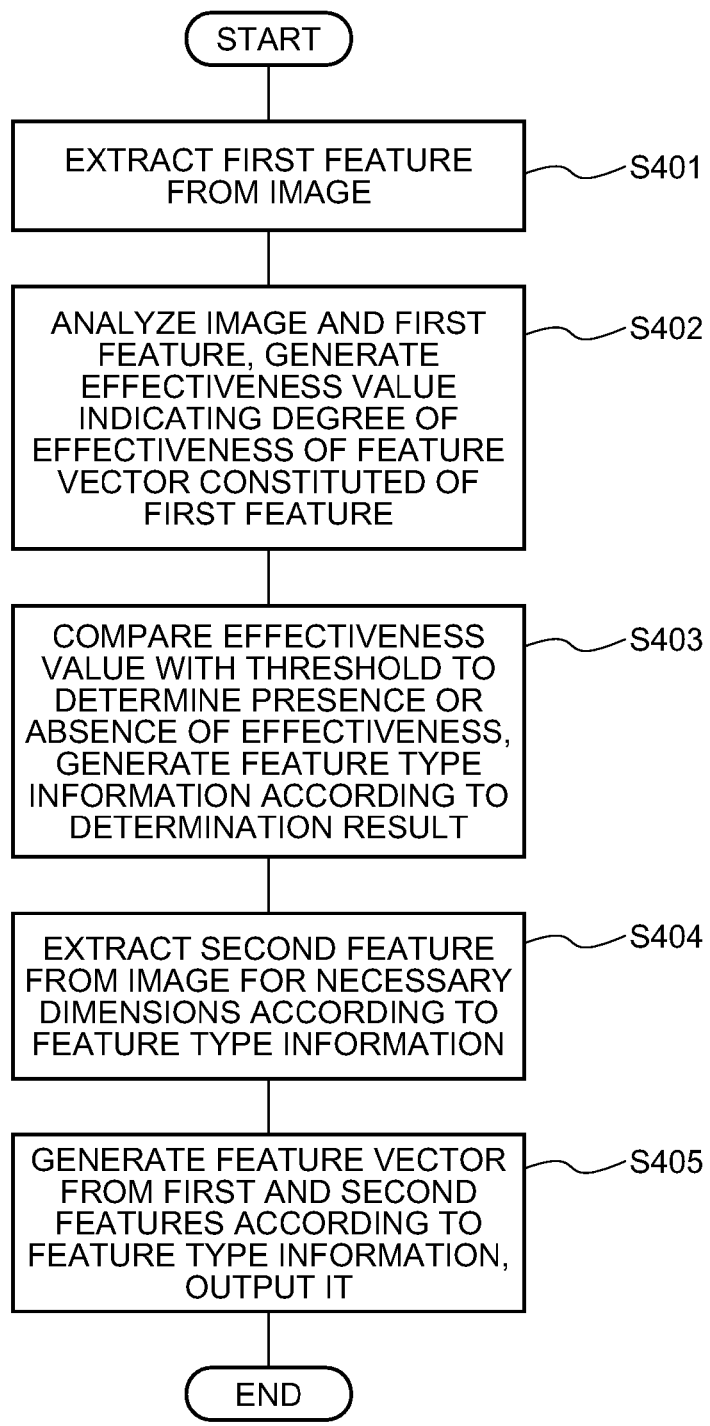
FIG. 9 is a flowchart showing operation of the fourth embodiment of the present invention.

Next, operation of the image signature extraction device 400 according to the present embodiment will be described with reference to the flowchart of FIG. 9.

When the image signature extraction device 400 receives an image which is a subject for extracting an image signature from a storage means or the like not shown in FIG. 8, first, the first feature extraction means 110 extracts first features for the respective dimensions from the image (step S401).

Next, the effectiveness quantifying means 134 of the feature type determination means 130 analyzes the image and the first features extracted by the first feature extraction means 110, and generates an effectiveness value indicating the degree of effectiveness of the first feature vector constituted of the first features extracted from the image (step S402). Then, the feature type information generation means 132 compares the generated effectiveness value with a threshold to determine whether or not the first feature vector has effectiveness, and according to the determination result, generates feature type information specifying which of the first features or the second features are used as the features of the respective dimensions (step S403).

Then, the second feature extraction means 121 extracts second features for the dimensions for which the feature type information specifies to use the second features, from the image which is the subject for extracting the image signature (step S404).

Finally, the feature vector generation means 140 uses the first features extracted by the first feature extraction means 110 for the dimensions for which the feature type information specifies to use the first features, and uses the second features extracted by the second feature extraction means 121 for the dimensions for which the feature type information specifies to use the second features, to generate a feature vector for the dimensions, and outputs it as an image signature to the storage means or the like not shown in FIG. 8 (step S405).

According to the present embodiment, it is possible to achieve the following advantageous effects, in addition to the advantageous effects of the first embodiment.

As the effectiveness of the first feature vector is determined from the image and the first feature vector constituted of the first features extracted from the image, the effectiveness of the first feature vector can be determined in both cases where the effectiveness can be determined using the image even if the effectiveness cannot be determined from the first feature vector itself and where the effectiveness can be determined using the first feature vector even if the effectiveness cannot be determined from the image itself.

Further, according to the present embodiment, it is possible to reduce the processing cost because the second feature extraction means 121 needs to extract the second features for the necessary dimensions only when the second features are required. If there is no need to reduce the processing cost, the second feature extraction means 121 may be replaced with the second feature extraction means 120 used in the first embodiment.

Fifth Embodiment

Figure 10:
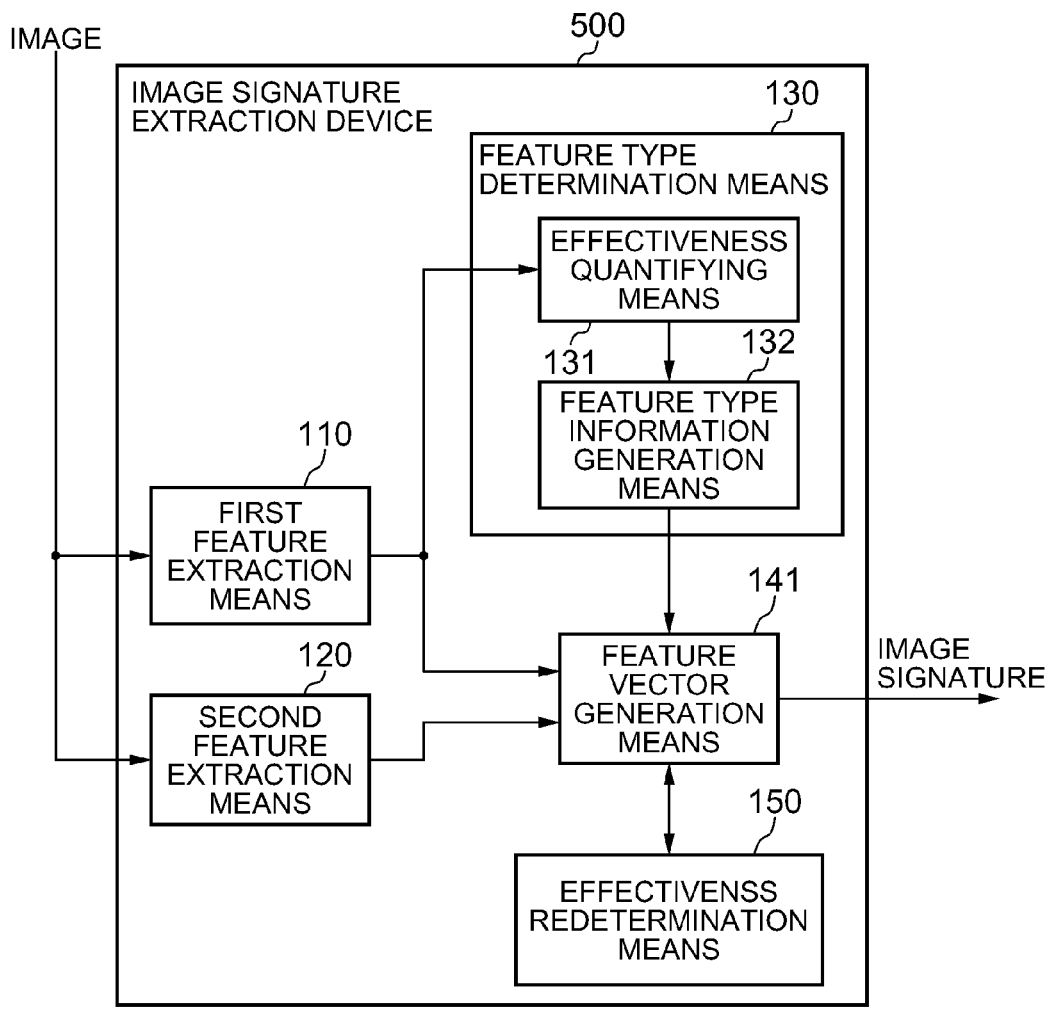
FIG. 10 is a block diagram showing a fifth embodiment of the present invention.

Referring to FIG. 10, an image signature extraction device 500 according to a fifth embodiment of the present invention differs from the image signature extraction device 100 shown in FIG. 1 in that a feature vector generation means 141 is provided instead of the feature vector generation means 140, and an effectiveness redetermination means 150 is added.

The feature vector generation means 141 receives the first features of the respective dimensions from the first feature extraction means 110, receives the second features of the respective dimensions from the second feature extraction means 120, receives feature type information from the feature type information generation means 132, and uses the first features supplied from the first feature extraction means 110 for the dimensions for which the feature type information indicates to use the first features and uses the second features supplied from the second feature extraction means 120 for the dimensions for which the feature type information indicates to use the second features, to generate a feature vector. If the generated feature vector only consists of the first features, the feature vector generation means 141 outputs the generated feature vector as an image signature.

On the other hand, if the generated feature vector includes second features, that is, if the first feature vector only consisting of the first features is determined to have no effectiveness and resultantly generates a feature vector (hereinafter referred to as a second feature) in which the first features of at least part of the dimensions are replaced with the second features, the feature vector generation means 141 transmits the second feature vector to the effectiveness redetermination means 150 to cause the means to determine the effectiveness of the second. Then, the feature vector generation means 141 receives a determination result of the effectiveness of the second feature vector from the effectiveness redetermination means 150, and if the determination result indicates that the second feature vector has effectiveness, outputs the second feature vector as an image signature. In contrast, if the determination result indicates that the second feature vector does not have effectiveness, the feature vector generation means 141 outputs the first feature vector as an image signature.

The effectiveness redetermination means 150 analyzes the second feature vector, generates an effectiveness value indicating the degree of effectiveness of the second feature vector, and compares the effectiveness value with a threshold to determine whether or not the second feature vector has effectiveness. As a method for generating an effectiveness value indicating the degree of effectiveness of the second feature vector, a method which is the same as that used to generate the effectiveness value indicating the degree of effectiveness of the first feature vector by analyzing the first feature vector, by the effectiveness quantifying means 131, may be used.

Figure 11:
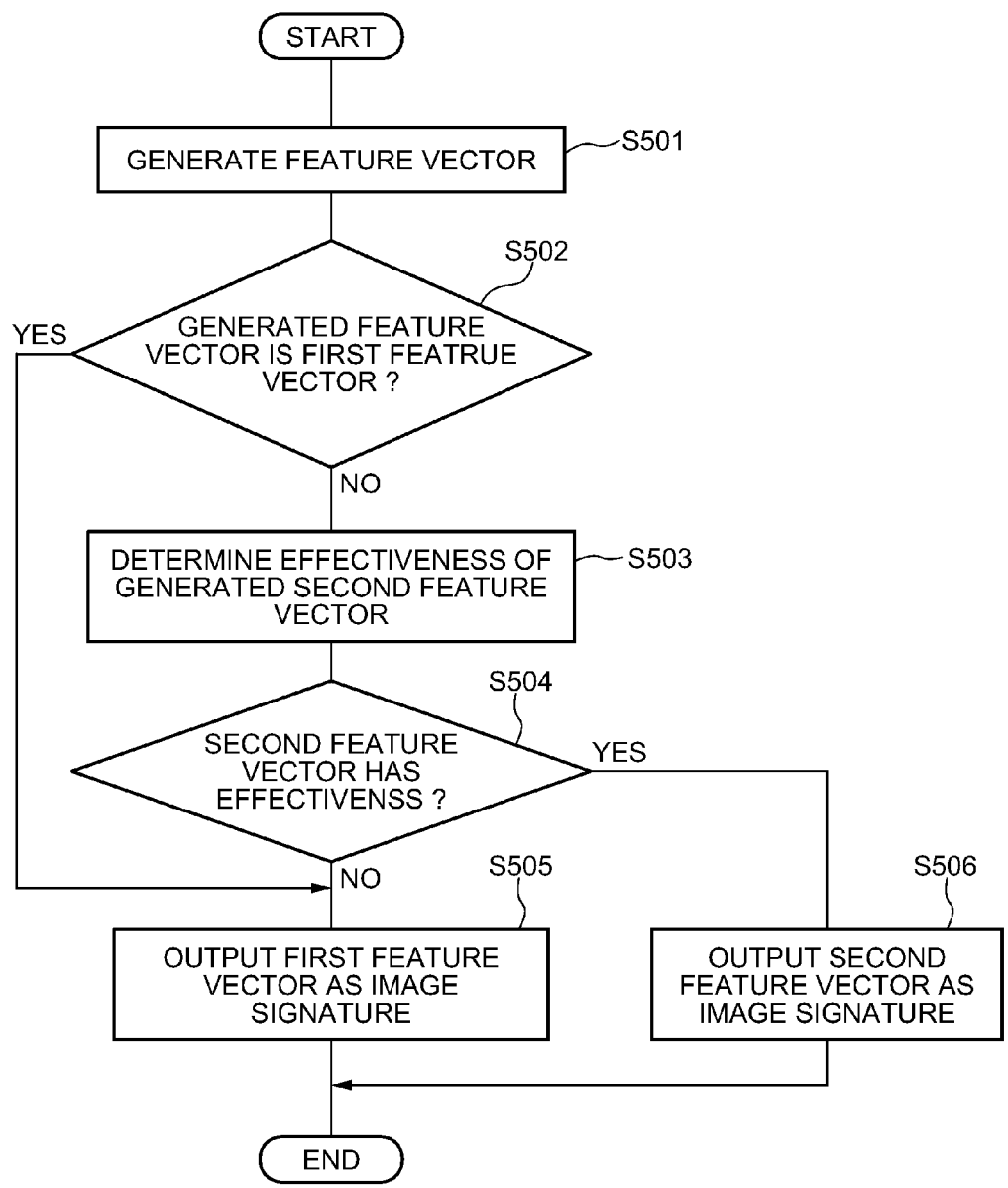
FIG. 11 is a flowchart showing operation of the fifth embodiment of the present invention.
Figure 12:
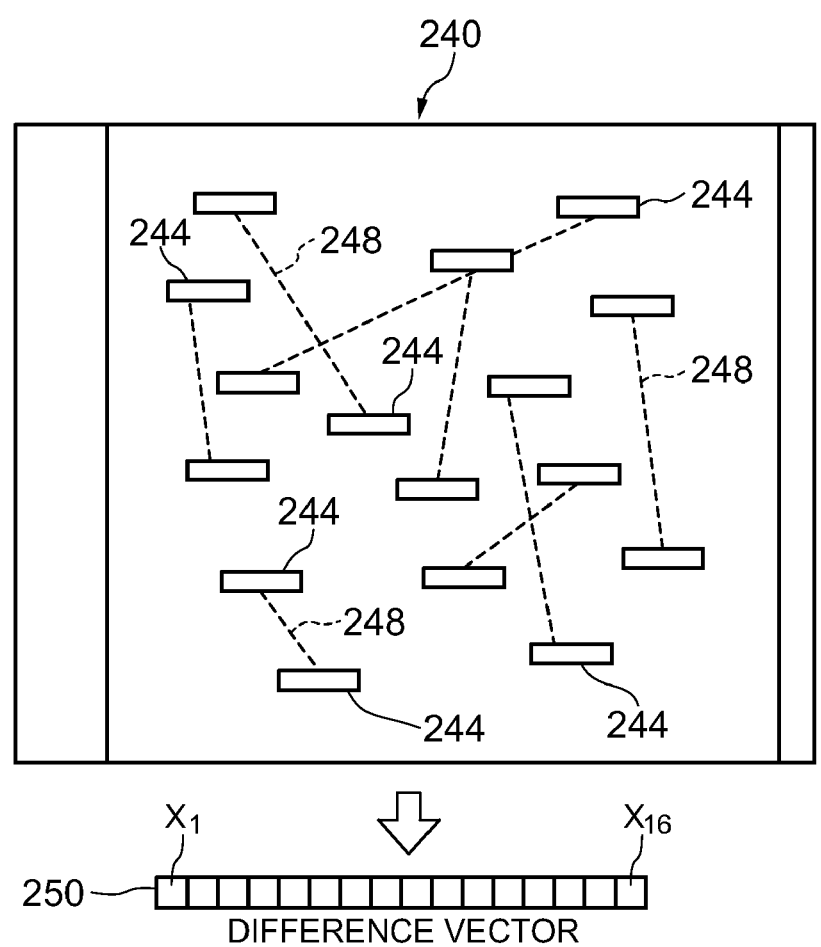
FIG. 12 is a diagram showing a method of extracting an image signature described in Patent Document 1.

Next, operation of the image signature extraction device 500 according to the present embodiment will be described with reference to the flowchart shown in FIG. 11.

When the image signature extraction device 500 receives an image which is a subject for extracting an image signature from a storage means or the like not shown in FIG. 10, first, the image signature extraction device 500 generates a feature vector of the image using the first feature extraction means 110, the second feature extraction means 120, the feature type determination means 130, and the feature vector generation means 141 (step S501). Step S501 corresponds to steps S101 to S105 in FIG. 3. However, the feature vector is not output immediately as an image signature, but the following processing is performed sequentially.

First, the feature vector generation means 141 determines whether or not the generated feature vector is a first feature vector (step S502). If it is a first feature vector, the feature vector generation means 141 outputs it as an image signature (step S505).

If the generated feature vector is not a first feature vector but a second feature vector, the effectiveness redetermination means 150 determines whether or not the second feature vector has effectiveness (steps S503, S504). As a result, if the second feature vector has effectiveness, the feature vector generation means 141 outputs the second feature vector as an image signature (step S506).

On the other hand, if the feature vector does not have effectiveness, the feature vector generation means 141 outputs the first feature vector as an image signature (step S505). Although the second feature vector is supposed to be output because neither the first feature vector nor the second feature vector has no effectiveness, as the features of at least part of the dimensions in the second feature vector are replaced with second features, the first feature vector in which such a replacement has not been performed is output. It should be noted that if neither the first feature vector nor the second feature vector has effectiveness, it is also possible to compare the values indicating the degree of their effectiveness and output the one having a higher degree of effectiveness as an image signature.

According to the present embodiment, it is possible to achieve the following advantageous effect, in addition to the advantageous effects of the first embodiment.

Regarding the second feature vector which is formed by replacing, with the second features, the features of at least part of the dimensions in the first feature vector which has been determined not to have effectiveness, whether or not the second feature vector has effectiveness is determined, and the second feature vector is output as an image signature only when the second feature vector has effectiveness or when the effectiveness is improved. Thereby, it is possible to prevent an image signature from being generated from the second feature vector in which the effectiveness thereof is not improved compared with that of the first feature vector.

It should be noted that while the image signature extraction device 500 of the present embodiment is configured such that the effectiveness redetermination means 150 is added to the image signature extraction device 100 of the first embodiment, it is also possible to add the effectiveness redetermination means 150 to the image signature extraction device 200, 300, or 400 of the second embodiment, the third embodiment, or the fourth embodiment.

While the embodiments of the present invention have been described above, the present invention is not limited to these examples, and various additions and modifications may be made therein. Further, the image signature extraction device of the present invention is adapted such that the functions thereof can be realized by computers and programs, as well as hardware. Such a program is provided in the form of being written on a computer readable recording medium such as a magnetic disk, a semiconductor memory, or the like, is read by a computer when the computer is started for example, and controls operation of the computer, to thereby allow the computer to function as the image signature extraction device of the above-described embodiments.

This application is based upon and claims the benefit of priority from Japanese patent application No. 2009-12813, filed on Jan. 23, 2009, the disclosure of which is incorporated herein in their entirety by reference.

REFERENCE NUMERALS

| | |
|---|---|
| 100, 200, 300, 400, 500 | image signature extraction device |
| 110, 111 | first feature extraction means |
| 120, 121 | second feature extraction means |
| 130 | feature type determination means |
| 131, 133, 134 | effectiveness quantifying means |
| 132 | feature type information generation means |
| 140, 141 | feature vector generation means |
| 151 | effectiveness redetermination means |

The invention claimed is:

1. An image signature extraction device, comprising:
a first feature extraction unit that extracts, from an image, a first feature corresponding to each of dimensions of a feature vector, the first feature being a quantization value obtained by quantizing a physical quantity extracted from the image;
a second feature extraction unit that extracts, from the image, a second feature which is different from the first feature corresponding to each of dimensions of a feature vector;
a feature type determination unit that analyzes at least one of the image and the extracted first feature as a subject for analysis to determine whether or not the feature vector constituted of the extracted first features has effectiveness in discriminating an image, and if the feature vector has the effectiveness, determines the first feature to be a type of the feature used for each of the dimensions, while if the feature vector does not have the effectiveness, determines the second feature to be a type of the feature used for each of the dimensions in which the first feature is a predetermined quantization value and determines the first feature to be a type of the feature used for each of remaining dimensions; and a feature vector generation unit that generates a feature vector of the image from the extracted first feature and the extracted second feature according to the determined type of the feature used for each of the dimensions.

2. The image signature extraction device, according to claim 1, wherein the feature type determination unit analyzes the subject for analysis, calculates a degree of the effectiveness of the feature vector constituted of the extracted first features as an effectiveness value, compares the effectiveness value with a threshold to determine whether or not the feature vector has the effectiveness, and determines the type of the feature used for each of the dimensions according to a determination result.

3. The image signature extraction device, according to claim 2, wherein the feature type determination unit quantifies a discrimination capability of the feature vector constituted of the first features as the effectiveness value, the discrimination capability indicating a degree of discriminating a different image.

4. The image signature extraction device, according to claim 2, wherein the feature type determination unit quantifies robustness of the feature vector constituted of the first features as the effectiveness value, the robustness indicating a degree that a value of a feature is not changed by various alteration processing applied to the image.

5. The image signature extraction device, according to claim 2, wherein if the first feature is a quantization value obtained by quantizing a physical quantity extracted from the image, the feature type determination unit uses the number of dimensions having predetermined quantization values of the feature vector constituted of the first features, as the effectiveness value.

6. The image signature extraction device, according to claim 2, wherein if the first feature is a quantization value obtained by quantizing a physical quantity extracted from the image, the feature type determination unit calculates a numerical value indicating robustness of the feature vector constituted of the first features based on a value of robustness having been set beforehand for each quantization value, the value of robustness indicating a degree that the quantization value is not changed by various alteration processing applied to the image, and uses the calculated numerical value as the effectiveness value.

7. The image signature extraction device, according to claim 6, wherein the feature type determination unit uses a mean value of values of robustness for the respective given quantization values as the effectiveness value.

8. The image signature extraction device, according to claim 4, wherein the feature type determination unit determines the number of dimensions for which the second feature is used, based on the effectiveness value.

9. The image signature extraction device, according to claim 8, wherein the feature type determination unit has a priority table providing priority of dimensions for which the second features are used, and with reference to the priority table, selects dimensions for which the second features are used for the number of dimensions for which it is determined to use the second features, starting from a dimension of higher priority.

10. The image signature extraction device, according to claim 1, wherein the first feature and the second feature are information relating to an edge of the image and information relating to color of the image.

11. An image signature extraction method, comprising:

extracting, from an image, a first feature corresponding to each of dimensions of a feature vector, the first feature being a quantization value obtained by quantizing a physical quantity extracted from the image;

extracting, from the image, a second feature which is different from the first feature corresponding to each of dimensions of a feature vector;

analyzing at least one of the image and the extracted first feature as a subject for analysis to determine whether or not the feature vector constituted of the extracted first features has effectiveness in discriminating an image, and if the feature vector has the effectiveness, determining the first feature to be a type of the feature used for each of the dimensions, while if the feature vector does not have the effectiveness, determining the second feature to be a type of the feature used for each of the dimensions in which the first feature is a predetermined quantization value and determining the first feature to be a type of the feature used for each of remaining dimensions; and generating a feature vector of the image from the extracted first feature and the extracted second feature according to the determined type of the feature used for each of the dimensions.

12. The image signature extraction method, according to claim 11, wherein determining a type of the feature used for each of the dimensions includes analyzing the subject for analysis, calculating a degree of the effectiveness of the feature vector constituted of the extracted first features as an effectiveness value, comparing the effectiveness value with a threshold to determine whether or not the feature vector has the effectiveness, and determining the type of the feature used for each of the dimensions according to a determination result.

13. The image signature extraction method, according to claim 12, wherein determining a type of the feature used for each of the dimensions includes quantifying a discrimination capability of the feature vector constituted of the first features as the effectiveness value, the discrimination capability indicating a degree of discriminating a different image.

14. The image signature extraction method, according to claim 12, wherein determining a type of the feature used for each of the dimensions includes quantifying robustness of the feature vector constituted of the first features as the effectiveness value, the robustness indicating a degree that a value of a feature is not changed by various alteration processing applied to the image.

15. The image signature extraction method, according to claim 12, wherein determining a type of the feature used for each of the dimensions includes, if the first feature is a quantization value obtained by quantizing a physical quantity extracted from the image, using the number of dimensions having predetermined quantization values of the feature vector constituted of the first features, as the effectiveness value.

16. The image signature extraction method, according to claim 12, wherein
determining a type of the feature used for each of the dimensions includes, if the first feature is a quantization value obtained by quantizing a physical quantity extracted from the image, calculating a numerical value indicating robustness of the feature vector constituted of the first features based on a value of robustness having been set beforehand for each quantization value, the value of robustness indicating a degree that the quantization value is not changed by various alteration processing applied to the image, and using the calculated numerical value as the effectiveness value.

17. The image signature extraction method, according to claim 16, wherein
determining a type of the feature used for each of the dimensions includes using a mean value of values of robustness for the respective given quantization values as the effectiveness value.

18. The image signature extraction method, according to claim 14, wherein
determining a type of the feature used for each of the dimensions includes determining the number of dimensions for which the second feature is used, based on the effectiveness value.

19. The image signature extraction method, according to claim 18, wherein
a priority table defining priority of dimensions for which the second feature is used is provided, and
determining a type of the feature used for each of the dimensions includes, with reference to the priority table, selecting dimensions for which the second features are used for the number of dimensions for which it is determined to use the second features, starting from a dimension of higher priority.

20. The image signature extraction method, according to claim 11, wherein the first feature and the second feature are information relating to an edge of the image and information relating to color of the image.

21. A computer-readable memory storing a computer program comprising instructions for causing a computer to function as:
a first feature extraction unit that extracts, from an image, a first feature corresponding to each of dimensions of a feature vector, the first feature being a quantization value obtained by quantizing a physical quantity extracted from the image;
a second feature extraction unit that extracts, from the image, a second feature which is different from the first feature corresponding to each of dimensions of a feature vector;
a feature type determination unit that analyzes at least one of the image and the extracted first feature as a subject for analysis to determine whether or not the feature vector constituted of the extracted first features has effectiveness in discriminating an image, and if the feature vector has the effectiveness, determines the first feature to be a type of the feature used for each of the dimensions, while if the feature vector does not have the effectiveness, determines the second feature to be a type of the feature used for each of the dimensions in which the first feature is a predetermined quantization value and determines the first feature to be a type of the feature used for each of remaining dimensions; and
a feature vector generation unit that generates a feature vector of the image from the extracted first feature and the extracted second feature according to the determined type of the feature used for each of the dimensions.

* * * * *

UNITED STATES PATENT AND TRADEMARK OFFICE
CERTIFICATE OF CORRECTION

PATENT NO. : 8,170,341 B2
APPLICATION NO. : 13/145482
DATED : May 1, 2012
INVENTOR(S) : Kota Iwamoto and Ryoma Oami It is certified that error appears in the above-identified patent and that said Letters Patent is hereby corrected as shown below:

Column 4, Line 46-47 (approx):

Delete " $\begin{array}{l} 0 \text{ (if } |Vn1 - Vn2| \leq th) \\ 1 \text{ if } |Vn1 - Vn2| > th \text{ and } Vn1 \leq Vn2) \end{array}$ ," and insert -- $\begin{array}{l} 0 \text{ (if } |Vn1-Vn2| \leq th) \\ -1 \text{ (if } |Vn1-Vn2| > th \text{ and } Vn1 \leq Vn2) \end{array}$ --, therefor.

Column 5, Line 56: Delete "meaning" and insert -- meaning. --, therefor

Signed and Sealed this
Twentieth Day of November, 2012

David J. Kappos
*Director of the United States Patent and Trademark Office*